US012367781B2

(12) United States Patent
Vidal Franco et al.

(10) Patent No.: US 12,367,781 B2
(45) Date of Patent: Jul. 22, 2025

(54) UNMANNED AERIAL VEHICLE (UAV) COLLISION PREVENTION

(71) Applicant: The Boeing Company, Chicago, IL (US)

(72) Inventors: José Ignacio Vidal Franco, Santiago de Compostela (ES); Alejandro Fransoy Pereira, A Coruña (ES); Ernesto Valls Hernandez, A Coruña (ES)

(73) Assignee: The Boeing Company, Arlington, VA (US)

( * ) Notice: Subject to any disclaimer, the term of this patent is extended or adjusted under 35 U.S.C. 154(b) by 190 days.

(21) Appl. No.: 17/676,068

(22) Filed: Feb. 18, 2022

(65) Prior Publication Data

US 2023/0267845 A1 Aug. 24, 2023

(51) Int. Cl.

| | |
|---|---|
| ***G08G 5/55*** | (2025.01) |
| ***G08G 5/34*** | (2025.01) |
| ***G08G 5/57*** | (2025.01) |
| ***G08G 5/58*** | (2025.01) |
| ***G08G 5/59*** | (2025.01) |
| ***G08G 5/80*** | (2025.01) |

(52) U.S. Cl.

CPC ................. *G08G 5/55* (2025.01); *G08G 5/34* (2025.01); *G08G 5/57* (2025.01); *G08G 5/58* (2025.01); *G08G 5/59* (2025.01); *G08G 5/80* (2025.01)

(58) Field of Classification Search

CPC ................. G08G 5/0091; G08G 5/025; G08G 1/096827; G08G 5/00; G08G 5/04; G08G 1/16; G08G 5/723; B64D 45/00; G06Q 10/087; G06Q 10/083; G01P 5/001; G05D 1/0027; G05D 1/1062; G05D 1/102; B60W 30/095; B60W 50/0205; B60W 30/0205; H04W 4/029

See application file for complete search history.

(56) References Cited

U.S. PATENT DOCUMENTS

| | | | | |
|---|---|---|---|---|
| 7,778,891 | B1 * | 8/2010 | Zhang | G06Q 10/087 705/28 |
| 8,706,357 | B1 * | 4/2014 | van den Heuvel | B64D 45/00 701/14 |
| 10,102,758 | B1 * | 10/2018 | Beaurepaire | G05D 1/102 |
| 10,229,462 | B2 * | 3/2019 | Bogovich | H04W 4/029 |
| 2014/0277924 | A1 * | 9/2014 | van den Heuvel | B64D 45/00 701/33.4 |

(Continued)

FOREIGN PATENT DOCUMENTS

| | | | | |
|---|---|---|---|---|
| JP | 2006277165 A | * 10/2006 | | G08G 1/16 |
| JP | 2008019726 A | * 1/2008 | | B60W 30/095 |

*Primary Examiner* — Yuri Kan

(74) *Attorney, Agent, or Firm* — Harrity & Harrity, LLP

(57) ABSTRACT

Systems and methods for unmanned aerial vehicle (UAV) collision prevention are provided. The method includes receiving an indication of a location as a no crash zone (NCZ), calculating a trajectory for flight of a vehicle including a plurality of location points, generating a risk score for each location point of the plurality of location points, generating, based on the generated risk scores for each of the location points, a flight risk value for the trajectory of the flight of the vehicle, determining the flight risk value is below a risk threshold, and loading the trajectory to the vehicle.

20 Claims, 12 Drawing Sheets

(56) References Cited

U.S. PATENT DOCUMENTS

| | | | | |
|---|---|---|---|---|
| 2015/0235559 | A1* | 8/2015 | Alekseev | G08G 5/025 701/120 |
| 2015/0336667 | A1* | 11/2015 | Srivastava | G05D 1/1062 701/2 |
| 2016/0059855 | A1* | 3/2016 | Rebhan | B60W 30/095 701/41 |
| 2016/0171621 | A1* | 6/2016 | Bogovich | G08G 1/096827 705/4 |
| 2016/0217694 | A1* | 7/2016 | Batla | G06Q 10/083 |
| 2020/0233411 | A1* | 7/2020 | Ivanov | G05D 1/0027 |
| 2020/0233439 | A1* | 7/2020 | Ivanov | G01P 5/001 |
| 2021/0237724 | A1* | 8/2021 | Zhao | B60W 50/0205 |
| 2022/0011783 | A1* | 1/2022 | Groden | G08G 5/53 |

* cited by examiner

301

303

311

313

UNMANNED AERIAL VEHICLE (UAV) COLLISION PREVENTION

BACKGROUND

Unmanned vehicles, for examples unmanned aerial vehicles (UAVs), operate according to standards and best practices that account for safety buffers when defining areas of operation. The safety buffers are designed to prevent the UAV from causing damage to surrounding airspace or ground areas in the event of a loss of control event. For example, a safety buffer is proposed and generally accepted by regulatory authorities to define a ground risk class to contain a possibly uncontrolled UAV. However, these methods are generally performed by manually setting a geofence in combination with no fly zones (NFZs) contained in standard databases. These solutions fail to effectively consider combinations of velocities and altitudes that affect a crash trajectory in a loss of control event.

SUMMARY

The disclosed examples are described in detail below with reference to the accompanying drawing figures and listed below. The following summary is provided to illustrate examples or implementations disclosed herein. It is not meant, however, to limit all examples to any particular configuration or sequence of operations.

In one implementation, a system for UAV collision prevention is provided. The system includes at least one processor and a memory storing instructions that, when executed by the at least one processor, cause the at least one processor to receive an indication of a location as a no crash zone (NCZ); calculate a trajectory for flight of an unmanned aerial vehicle (UAV), the trajectory includes a plurality of location points; generate a risk score for each location point of the plurality of location points; generate, based on the generated risk scores for each of the location points, a flight risk value for the trajectory of the flight of the UAV; determine a risk threshold for the trajectory for the flight of the UAV based on an operation of the flight of the UAV; determine the flight risk value is below the determined risk threshold; and load the trajectory to the UAV.

Other technical features may be readily apparent to one skilled in the art from the following figures, descriptions, and claims.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Corresponding reference characters indicate corresponding parts throughout the accompanying drawings.

DETAILED DESCRIPTION

Figure 1:
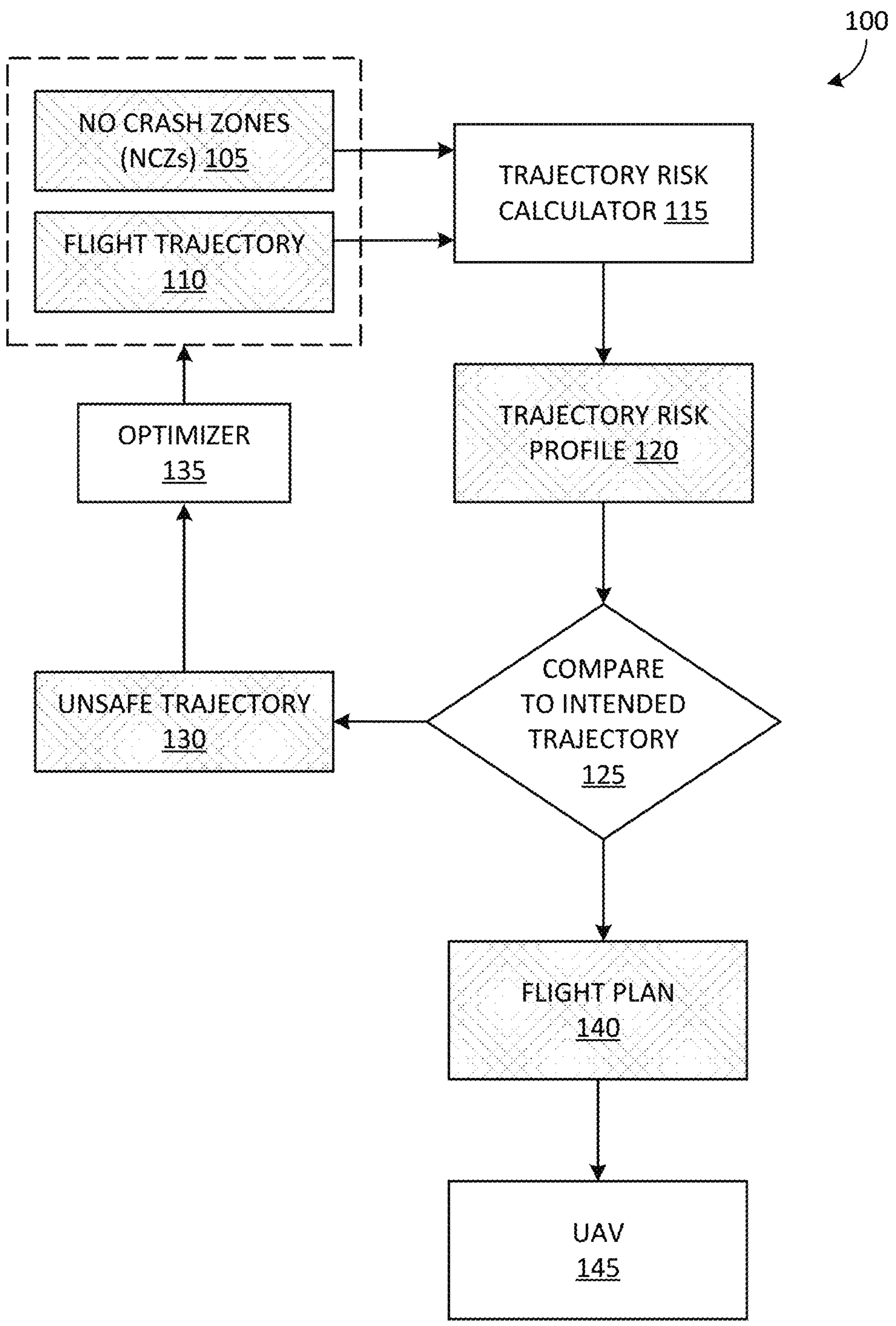
FIG. 1 illustrates a schematic view of a system for preventing collisions of a UAV according to various implementations of the present disclosure.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all implementations.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to an implementation or an example are not intended to be interpreted as excluding the existence of additional examples that also incorporate the recited features. Moreover, unless explicitly stated to the contrary, examples "comprising" or "having" an element or a plurality of elements having a particular property could include additional elements not having that property.

As referenced herein, a UAV is an aerial vehicle that is not manned by one or more humans. In some implementations, the UAV is manually operated by a human operator. In other implementations, the UAV is automatically operated and follows pre-determined or pre-loaded flight paths. As referenced herein, the UAV can also be referred to as a drone. As described in greater detail below, the UAV can be included in a system that includes one or more UAVs, ground stations, and means for communication between the UAVs and the ground station, other UAVs, other elements outside the system, and so forth.

As referenced herein, a loss of control event is an instance in which, for manually controlled missions, the operator of the UAV loses control of the UAV or, for missions in which an on-board computer onboard the UAV controls the flight, the UAV fails to follow the pre-determined flight path. Examples of a loss of control event include a loss of power (LOP) event, a loss of engine (LOE) engine, or another electrical or mechanical failure.

As referenced herein, a no fly zone (NFZ) is a location in which vehicles, including one or both of manned aerial vehicles and UAVs, are restricted from operating. In some implementations, a NFZ is designated by a regulatory authority. In some implementations, a NFZ refers to a temporary flight restriction (TFR), in which a NFZ is designated as such only for a period of time and for a particular purpose, for example UAV size, altitude, date or time, and so forth. In some implementations, a NFZ applies only to taking off or landing and does not restrict flight in the airspace above the identified area.

As referenced herein, a no crash zone (NCZ) is an area identified as an area in which a UAV cannot crash in the event of a loss of control event. An NCZ includes infrastructure, such as buildings, roads, bridges, and so forth, and areas that are populated, such as cities, parks, and so forth. In some implementations, an NCZ is defined manually, such as by a manual operator of the UAV or a system that includes the UAV. In other implementations, an NCZ is defined automatically, such as by an onboard computer of a UAV or a system that includes the UAV, based on known geography of an area.

In some implementations, a NCZ includes part or all of an NFZ. However, a NCZ can also include locations or areas that are outside of an NFZ. In some implementations, a NFZ includes part or all of an NCZ. However, a NFZ can also include locations or areas that are outside of an NCZ. Thus, the areas and locations identified as NCZs and NFZs can differ.

As noted above, current methods for generating flight trajectories for UAVs are done manually by taking into account NFZs. Prior to a mission or a flight, an operator of the UAV manually defines geofence parameters, which are set into the UAV so the onboard flight computer prevents the UAV from entering or taking off from the an area defined by the geofence parameters. As referenced herein, the geofence is a standard feature among civil UAV manufacturers. The geofence can be combined with NFZs, which can be stored in and obtained from an online database. In some scenarios, the NFZs are contained in standard databases or manually determined by the operator of the UAV by extending the area to be protected with a safety buffer. The area to be protected can be calculated based on intuition and experience, a simple 1:1 rule where the horizontal safety buffer is equal to the maximum operating altitude, which is considered to contribute with the lowest integrity, or a combination of the two.

These methods fail to optimize the geofence parameters. For example, the geofence parameters may not be optimal, by setting the parameters larger than necessary, or safe, by setting the parameters smaller than necessary, because the parameters have not been calculated automatically using all of the best information available. In addition, these methods fail to distinguish between NCZs and NFZs and therefore do not protect the NCZ against critical failures. For example, certain combinations of velocities and altitudes still within the NFZ may lead to a crash collision trajectory that causes damage to a protected area, either a NFZ or NCZ. Accordingly, the current solutions lack automation, mathematical rigor, fail to consider relevant operational parameters, such as altitudes, velocities, and trajectories, and heavily depend on a manual operator's experience and intuition.

Other available solutions rely on the use of additional devices, such as parachutes or airbags, to reduce severity and additional risk. These solutions have a negative impact on the performance of the UAV.

Accordingly, implementations of the present disclosure provide a four-dimensional (4D) trajectory paired with probabilities of crashing into a NCZ if a critical failure, such as a loss of power (LOP) or loss of engine (LOE) event, occurs and a trajectory risk profile. A 4D flight trajectory is established and the probability of crashing into a NCZ is calculated for various points along the 4D flight trajectory, which allows the 4D flight trajectory to be optimized. Using the optimized 4D flight trajectory, a trajectory risk assessment can be generated in real-time in flight or to plan a mission in advance and select an optimal flight trajectory. Thus, the consequences and severity of a LOP or LOE event can be strategically and tactically mitigated by containing the risk of crashing into undesired areas, or zones, in a more sophisticated and reliable way than following the 1:1 rule described herein. Further, significant evidence is used and generated identifying that safety levels have been met, by producing various models, that support various outputs.

FIG. 1 illustrates a schematic view of a system for preventing collisions of a UAV according to various implementations of the present disclosure. The example system 100 illustrated in FIG. 1 is for illustration only. Various components of the system 100 can be added, omitted, and so forth without departing from the scope of the present disclosure. For example, the system can include one or more components of the electronic device 1000 described in greater detail below.

The system 100 includes NCZs 105 and a flight trajectory 110. One or both of the NCZs 105 and flight trajectory 110 can be defined by an operator or an optimizer, for example the optimizer 135 described below. In some implementations, the operator is a user operating the UAV. In other implementations, the operator is an onboard computer, such as a processor, onboard the UAV. The NCZs 105, as described herein, is a location in which the UAV cannot crash in a critical failure, such as a LOP event or LOE event. In some implementations, the optimizer 135 identifies the NCZs 105 and an optimal flight trajectory 110 based on the NCZs 105 and various flight and environmental conditions.

The flight trajectory 110 is a series of four-dimensional (4D) location points the UAV will pass will through on a particular flight. A 4D location point, also referred to herein as a waypoint, is a discrete and successive point in space with an associated speed. In some implementations, the flight trajectory 110 includes a plurality of 4D location points that are included at regular distance intervals along the flight trajectory. For example, each location point of the plurality of location points is placed to mark the location of the UAV every one hundred meters, every tenth of a mile, every quarter of a mile, or at any other suitable distance interval. In some implementations, the flight trajectory 110 includes a plurality of 4D location points that are included at regular time intervals along the flight trajectory. For example, each location point of the plurality of location points is placed to mark the location of the UAV every second, every three seconds, every five seconds, every ten seconds, every thirty seconds, or at any other suitable time interval.

The 4D location points along the flight trajectory 110 are provided in terms of latitude, longitude, altitude, and velocity. For example, each 4D location point includes a latitude value and longitude value identifying a latitude and longitude of the UAV at the 4D location point, an altitude value identifying an altitude of the UAV at the 4D location point, and a velocity the UAV at the 4D location point.

The system 100 further includes a trajectory risk calculator 115 that calculates, or generates, a risk of the UAV crashing into one of the NCZs 105 in the event of a critical failure at the particular 4D location point. In some implementations, the trajectory risk calculator 115 calculates the risk for each 4D location point along the flight trajectory 110. In some implementations, the trajectory risk calculator 115 calculates the risk for each 4D location point additionally based on one or more of uncertainty models, a geographical map of the area traversed by the flight trajectory 110, and aircraft falling mode information. Uncertainty models include a series of statistical distributions taking into account the imperfections in position and velocity magnitude while following the intended flight trajectory 110. The geographical map is a 3D terrain map that includes additional obstacles, such as terrain obstacles, infrastructure, and so forth. The aircraft falling mode information can include one or more models for how the UAV is expected to fall in the event of different types of critical failures. For example, a total LOP event results in a fall exemplified by a simplified parabolic trajectory, the failure of certain rotors can result in a series of uncontrolled spins, and so forth. In some implementations, the aircraft falling mode information includes a parachute drifting model, which takes into account environmental factors such as wind conditions, temperature, humidity, altitude, and so forth.

The system 100 calculates a trajectory risk profile 120 for the entire flight trajectory 110 based on the calculated risk for each of the 4D location points. In some implementations, the trajectory risk profile 120 is output as a numerical value. For example, the numerical value can be between zero and ten, zero and one hundred, or zero and one thousand, where zero represents the lowest risk and one thousand represents the highest risk.

The system 100 compares 125 the trajectory risk profile 120 to the intended flight trajectory 110 to determine whether the flight trajectory 110 is safe. For example, the trajectory risk profile 120 is compared to a threshold, such as a risk threshold, to determine a safety rating for the flight trajectory 110. In examples where the trajectory risk profile 120 is above the threshold, the flight trajectory 110 is determined to not be safe. An unsafe trajectory 130 response is generated and output to the optimizer 135 or an operator of the UAV 145. The optimizer 135 redefines the flight trajectory 110, including one or more of the flight path, indicated by the longitude, latitude, and altitude, and the velocity at one or more of the 4D location points. The optimizer 135 is described in greater detail in the description of FIGS. 7A and 7B below.

As described herein, in some implementations, an operator is a user operating the UAV or a system including the UAV, and manually redefines one or more parameters of the flight trajectory 110. For example, the operator can be a pilot in command (PIC) of the particular flight to be executed by the UAV. In other implementations, the operator is an onboard computer onboard the UAV and automatically redefines one or more parameters of the flight trajectory 110.

In examples where the trajectory risk profile 120 is lower than the threshold, the flight trajectory 110 is determined to be safe. A flight plan 140 including the flight trajectory 110 is generated and output to the UAV 145.

Figure 2A:
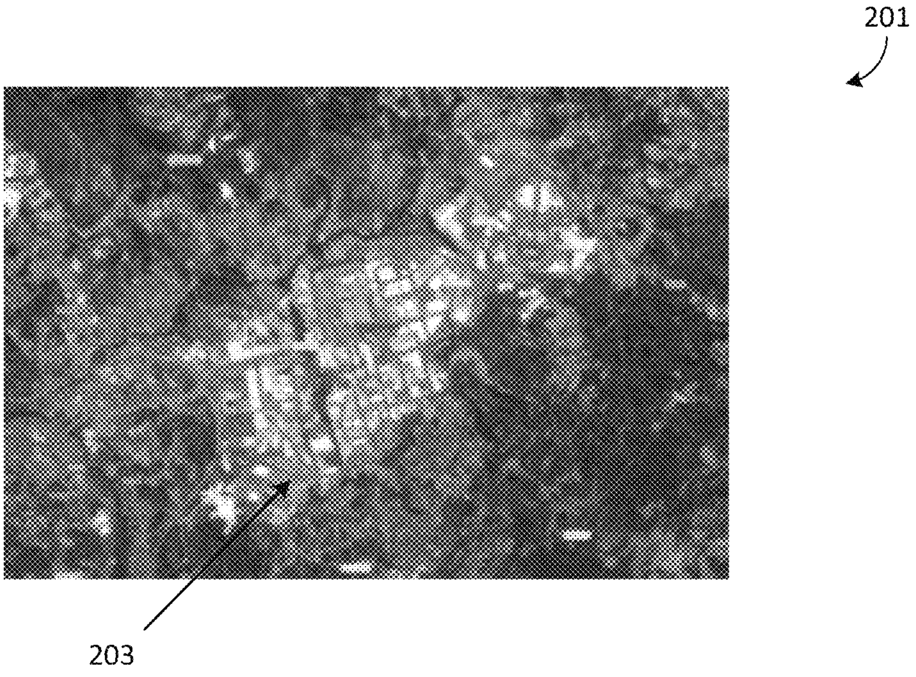
FIG. 2A illustrates an aerial view of a geographic area according to various implementations of the present disclosure.
Figure 2B:
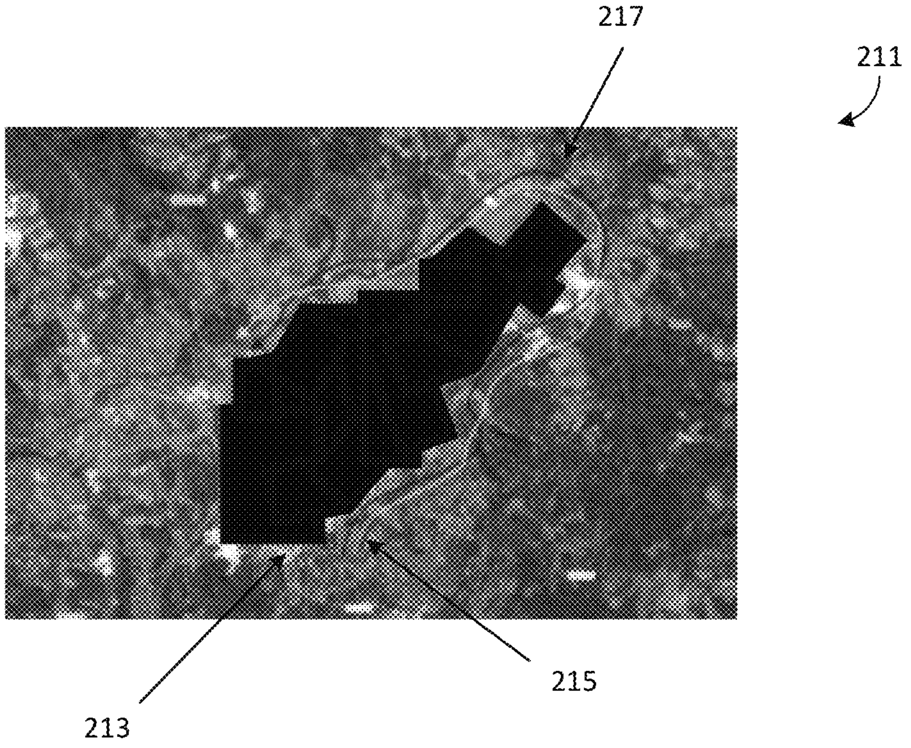
FIG. 2B illustrates an aerial view of the geographic area identified as a no crash zone (NCZ) according to various implementations of the present disclosure.

FIG. 2A illustrates an aerial view of a geographic area and FIG. 2B illustrates an aerial view of the geographic area identified as a NCZ according to various implementations of the present disclosure. The example aerial views presented in FIGS. 2A and 2B are for illustration only and should not be construed as limiting. Various components of the aerial views 201, 211 can be added, omitted, and so forth without departing from the scope of the present disclosure.

FIG. 2A illustrates an aerial view 201 of a geographic area. The geographic area includes an industrial area 203 that is shown to include infrastructure elements such as buildings, roads, and so forth. A preferred flight trajectory, such as the flight trajectory 110, to go from one side of the industrial area 203 to the other would avoid traversing the industrial area 203 due to the potential damage should a critical failure occur during the flight. Accordingly, as shown in FIG. 2B, the industrial area 203 is identified as a NCZ 213. As described herein, the NCZ 213 is to be avoided during a flight by the UAV 145.

FIG. 2B illustrates a first flight route 215 and a second flight route 217 for a flight by the UAV 145 that avoid the NCZ 213. In some implementations, each of the first flight route 215 and the second flight route 217 are iterations of the flight trajectory 110 described herein. In some implementations, the system 100 executes separately with each of the first flight route 215 and the second flight route 217 as flight trajectory 110 inputs to determine which of the first flight route 215 and the second flight route 217 is the safest flight trajectory and resilient against potential critical failures. In other words, the system 100 is executed as described herein with the first flight route 215 to determine the safety rating for the first flight route 215, the system 100 is executed as described herein with the second flight route 217 to determine the safety rating for the second flight route 217, and the safety ratings for each of the first flight route 215 and the second flight route 217 are compared to determine which has the higher safety rating.

Where the higher safety rating is greater than the risk threshold, the flight trajectory having the higher safety rating is selected and output as part of the flight plan 140. Where the higher safety rating is below the risk threshold, neither the first flight route 215 nor the second flight route 217 is determined to be safe enough to be executed and one or both of the first flight route 215 and the second flight route 217 are updated to improve the safety rating. For example, one or both of the first flight route 215 and the second flight route 217 can be updated to reduce velocities at particular 4D location points, move one or more 4D location points further away from the NCZ, increase or decrease altitude at one or more 4D location points, and so forth.

In some implementations, additional 4D location points are required to be updated in order for a problematic 4D location point to be effectively moved. For example, where a problematic 4D location point is required to move a certain distance away from the NCZ, additional 4D location points immediately preceding and following the problematic 4D location point along the flight trajectory 110 are also required to be moved in order for the problematic 4D location point to be effectively moved. As another example, where the velocity of a problematic 4D location point is required to be decreased to a particular magnitude, the respective velocities of additional 4D location points immediately preceding and following the problematic 4D location point along the flight trajectory 110 are also required to be decreased in order for the velocity of the problematic 4D location point to be effectively decreased.

Figure 3A:
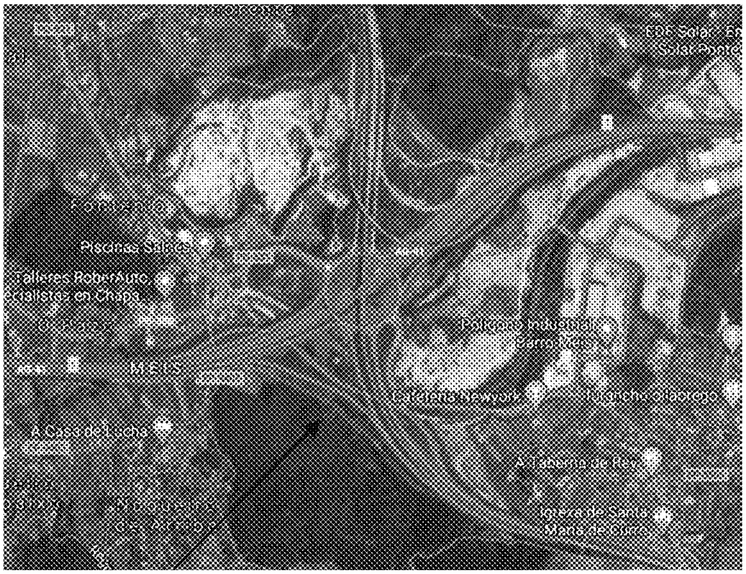
FIG. 3A illustrates an aerial view of a geographic area according to various implementations of the present disclosure.
Figure 3B:
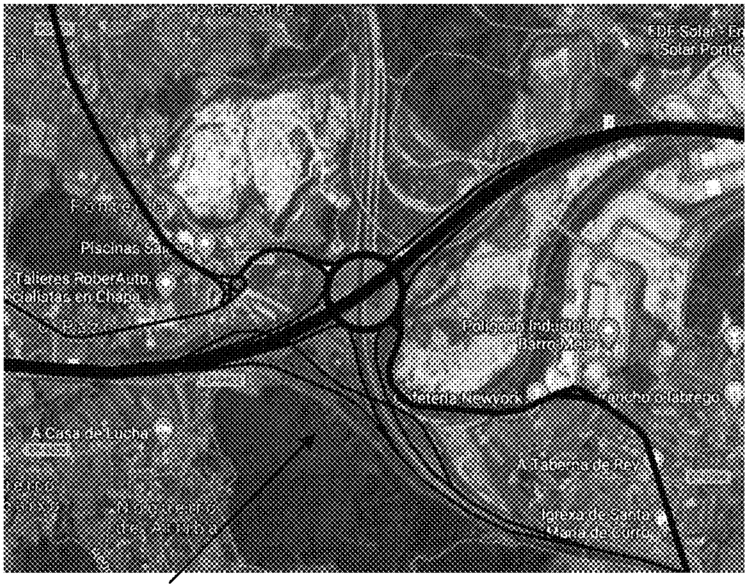
FIG. 3B illustrates an aerial view of the geographic area identified as a NCZ according to various implementations of the present disclosure.

FIG. 3A illustrates an aerial view of a geographic area and FIG. 3B illustrates an aerial view of the geographic area identified as a NCZ according to various implementations of the present disclosure. The example aerial views presented in FIGS. 3A and 3B are for illustration only and should not be construed as limiting. Various components of the aerial views 301, 311 can be added, omitted, and so forth without departing from the scope of the present disclosure.

FIG. 3A illustrates an aerial view 301 of a geographic area. The geographic area includes infrastructure elements such as road ways 303. In particular, the road ways 303 illustrated in FIG. 3A represent a complex traffic junction including highways, entrance ramps, exit ramps, loops, feeder or access roads, and so forth. A preferred flight trajectory, such as the flight trajectory 110, would avoid traversing the road ways 303 due to the potential damage should a critical failure occur during the flight. Accordingly, as shown in FIG. 3B, the road ways 303 are identified as a NCZ 313. As described herein, the NCZ 313 is to be avoided during any potential crash the UAV 145. In some implementations, the NCZ 313 is also to be avoided during flight, because entering the NCZ 313 can increase the risk of the crashing into the NCZ 313 if a critical failure event occurs.

Figure 4A:
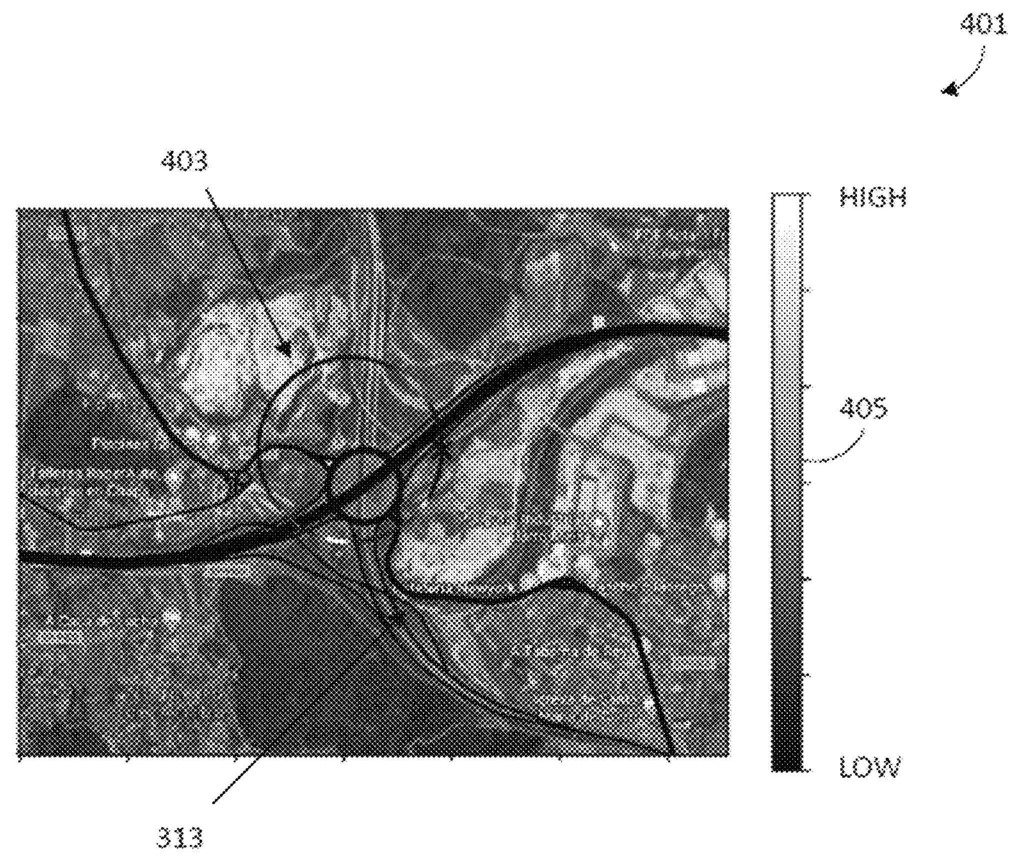
FIG. 4A illustrates a zenithal view of a last loop of a planned spiral trajectory and NCZ violation risk for the last loop according to various implementations of the present disclosure.
Figure 4B:
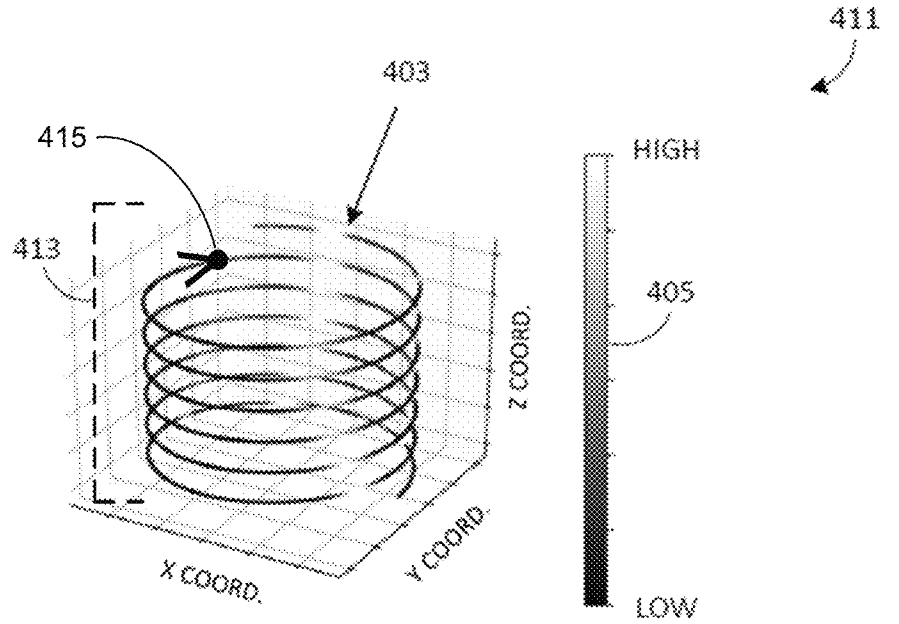
FIG. 4B illustrates a three-dimensional (3D) representation of a NCZ violation risk of the planned spiral trajectory according to various implementations of the present disclosure.
Figure 4C:
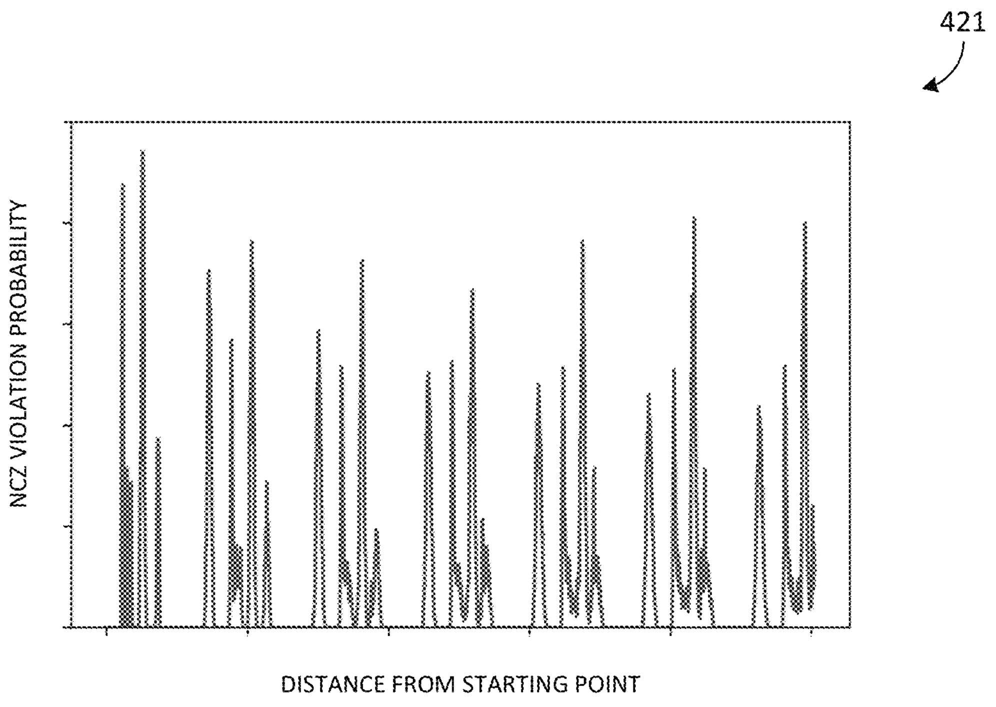
FIG. 4C illustrates a risk profile for the planned spiral trajectory according to various implementations of the present disclosure.

FIG. 4A illustrates a zenithal view of a last loop of a planned spiral trajectory and NCZ violation risk for the last loop according to various implementations of the present disclosure. FIG. 4B illustrates a three-dimensional (3D) representation of a NCZ violation risk of the planned spiral trajectory according to various implementations of the present disclosure. FIG. 4C illustrates a risk profile for the planned spiral trajectory according to various implementations of the present disclosure. The examples presented in FIGS. 4A-4C are for illustration only and should not be construed as limiting. Various components illustrated in FIGS. 4A-4C can be added, omitted, and so forth without departing from the scope of the present disclosure.

The zenithal view 401 illustrated in FIG. 4A illustrates a loop 403 of the planned spiral trajectory 413 overlaid on the NCZ 313 identified in FIG. 3B. Each portion of the loop 403 is identified with a risk value, as shown on the risk spectrum 405. For example, each portion of the loop 403 is shaded corresponding to the calculated risk value, calculated by the trajectory risk calculator 115. It should be understood in some instances, high risk values do not necessarily correspond 1:1 with the NCZ 313. For example, as shown in FIG. 4A, the high risk trajectory 4D location points are not directly over the NCZ 313 but in locations directly preceding or following the road ways 303 of the NCZ 313. This is because a critical failure at a same latitude and longitude, but different altitude, of the NCZ 313 will likely result in a crash away from the NCZ 313 due to the fall trajectory corresponding to the particular type of critical failure. Accordingly, a critical failure between road ways 303 of the NCZ 313 has a higher likelihood of crashing in the NCZ 313.

In one implementation, a parabolic free fall crashing model is implemented for a flight about the NCZ 313 having the planned spiral trajectory 413. In the parabolic free fall crashing model, if a critical failure is detected, the UAV 145 descends in a falling trajectory of a parabola that obeys gravitational forces and discards other aerodynamic forces. For example, the parabolic free fall crashing model can be used for multiple rotors of the UAV 145 experiencing a LOP or LOE event. The mission plan for the flight of the UAV 145 can consider an ascending spiral trajectory with a constant velocity magnitude of v=10 m/s and an uncertainty in the velocity magnitude is modelled by a standard distribution with $u_v$=10 m/s and $\sigma_v$=5 m/s. Also illustrated in FIG. 4B is an example of a 4D location point 415 on the trajectory 413. The example 4D location point 415 includes a 3D position (e.g., latitude, longitude, and altitude, as indicated by the dot) and a velocity (as indicated by the arrow).

The flight trajectory 110 can be loaded onto the UAV 145 in a variety of ways. In some implementations, the flight trajectory 110 is loaded onto the UAV 145 using a plurality of the 4D location points, or waypoints. In some implementations, the flight trajectory 110 is transformed to the mathematical definition of curves in a 3D space and used to compute the risk of crashing into a NCZ, such as the NCZ 313.

The flight trajectory 110 is defined as a series of cartesian coordinate points, each with an associated speed. For example, for an ascending circular flight path, i.e., a circular helix, the flight trajectory 110 can be parameterized as:

$$\vec{x}(t)=(R\cos(\omega t),R\sin(\omega t),Kt)$$

Where R is the radium (m), w is the angular speed (rad/s) and K is the climbing speed (m/s). The velocity is the time derivative of:

$$\vec{x}(t),\vec{v}(t)=(-R\omega\sin(\omega t),R\omega\cos(\omega t),K).$$

Where the constant linear speed ins v=10 m/s, the radius is 250 m, and the climbing speed is:

$$K = 1\ m/s,$$

$$\omega = \frac{v}{R} = \frac{10\ m/s}{250\ m} = 0.04\frac{\text{rad}}{s},$$

$$x(\vec{t}) = (250\cos(0.04t),\ 250\sin(0.04t),\ Kt),\ \text{and}$$

$$v(\vec{t}) = (10\sin(0.04t),\ 10\cos(0.04t),\ K).$$

An offset is added in order to shift the flight trajectory 110 from a point (0, 0), which provides:

$$\vec{x}(t)=(x_0+250\cos(0.04t),y_0+250\sin(0.04t),1t);\ \text{and}$$

$$\vec{v}(t)=(10\sin(0.04t),10\cos(0.04t),1)$$

for the particular flight trajectory 110.

FIG. 4B illustrates a 3D representation 411 of the planned spiral trajectory 413, including a NCZ violation risk. The loop 403, illustrated in FIGS. 4A and 4B, is the last loop of the planned spiral trajectory 413. Each portion of the planned spiral trajectory 413 is identified with a risk value, as shown on the risk spectrum 405. For example, each portion of the planned spiral trajectory 413 is shaded corresponding to the calculated risk value, calculated by the trajectory risk calculator 115.

The risk value is calculated by defining a function that computes the predicted crash site at each particular 4D location point. In some implementations, the function computes the predicted crash site using the parabolic free fall crashing model. A geographic map, for example the aerial view illustrated in FIG. 3B, is loaded. The predicted crash site is computed for each 4D location point and assigned a value, such as a 1 if predicted crash site is within the NCZ and a 0 if the predicted crash site is not within the NCZ.

As shown in FIG. 4B, the high risk zones typically change position with altitude in a non-trivial manner due to the parabolic free fall model. In the particular example illustrated in FIGS. 4A-4C, the high risk zones are aligned with the locations directly preceding or following the road ways 303 of the NCZ 313, as described herein. This is further illustrated in FIG. 4C, which illustrates a risk profile 421 for the planned spiral trajectory 413. More particularly, the risk profile 421 illustrates the NCZ violation probability as a function of traveled distance. The NCZ risk probability spikes at semi-regular intervals where the distance corresponds to the locations directly preceding or following the road ways 303 of the NCZ 313.

Based on the results described herein and illustrated in FIGS. 4B and 4C, aggregated risk scores, such as the total risk score and the specific total risk score, can be defined and used to determine whether the risk associated with the flight trajectory 110 is acceptable and within safety margins. For example, the total risk is illustrated by the points presented in FIG. 4B as a path integral of the function illustrated in FIG. 4B. As illustrated in FIG. 4B, the total risk score is 878.5, which represents the number of times through the entire flight trajectory 110 that the NCZ would be violated should a critical failure occur at each infinitesimal point of the flight trajectory 110. A specific total risk score is the total risk score divided by the length of the flight trajectory 110. For example, where the flight trajectory 110 has a length of 10,000 meters, the specific total risk is 0.08785.

Figure 5:
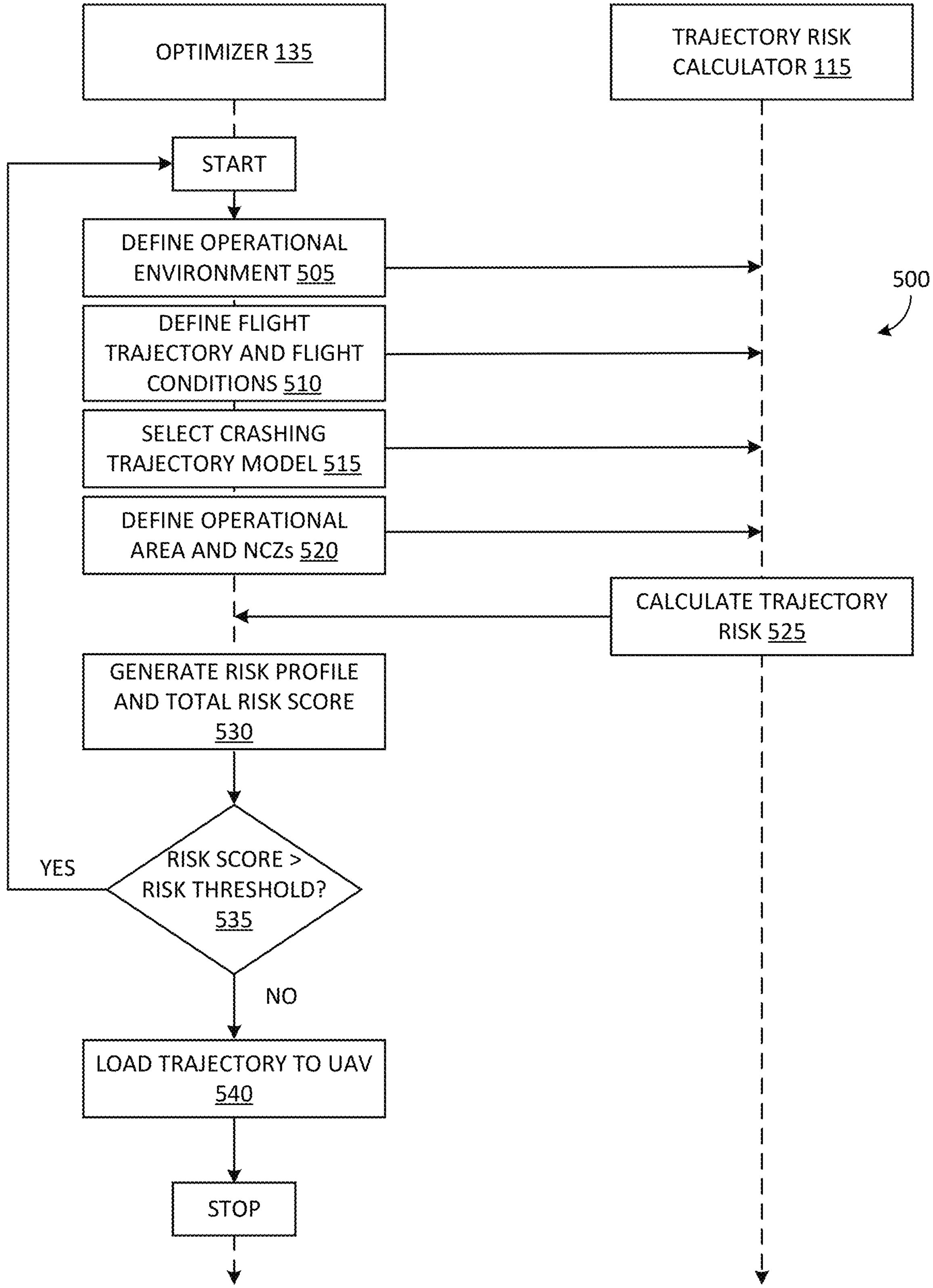
FIG. 5 illustrates a computer-implemented method of preventing collisions of a UAV according to various implementations of the present disclosure.

FIG. 5 illustrates a computer-implemented method of preventing collisions of a UAV according to various implementations of the present disclosure. The method 500 can be executed by one or more components described herein, such as the electronic device 1000.

The method 500 begins by the optimizer 135 defining an operational environment and sends the defined operational environment to the trajectory risk calculator 115 in operation 505. The operational environment is defined based on one or more models that capture the external conditions in which a UAV, for example the UAV 145, will execute a flight plan. In some implementations, the one or more models include a two-dimensional (2D) topographic map of the environment, a 3D elevation map of the environment, a 3D model of infrastructure and buildings in the environment, a weather model of the environment during the time the flight plan is to be executed, and so forth. It should be understood that the more precise that the models used are, the more precisely the operational environment will be defined as well.

In operation 510, the optimizer 135 defines the flight trajectory 110 and flight conditions and sends the defined flight trajectory 110 and flight conditions to the trajectory risk calculator 115. As described herein, the flight trajectory 110 is the series of 4D location points the UAV 145 follows and passes through during execution of the flight plan. The flight conditions are the preferred conditions for the flight as determined based on one or more statistical distributions that consider planned variability, i.e., real-world imperfections, in the execution of the flight trajectory 110. For example, the statistical distributions can consider one or more of planned velocity magnitudes, uncertainty in trajectory following, and so forth.

In one particular example, the flight trajectory 110 includes a plurality of waypoints that are all determined to be passed at a constant velocity, for example 10 m/s. However, environmental conditions, such as a wind gust, can cause the UAV 145 to slightly increase or decrease the velocity from 10 m/s for short periods of time until the velocity can be corrected. Similarly, the UAV 145 may not pass exactly through a particular waypoint, but miss the waypoint by a small distance, such as a few meters. By incorporating statistical distributions that take these uncertainties into account, a more realistic and robust crashing trajectory model and trajectory risk is determined. In some implementations, how wide or narrow the uncertainty distribution is provided depends on how well the UAV 145 is able to follow along the intended flight trajectory 110.

In operation 515, the optimizer 135 selects a crashing trajectory model and sends the selected crashing trajectory model to the trajectory risk calculator 115. Different crashing trajectory models are utilized to model crash trajectories for different types of critical failures. In some implementations, the crashing trajectory model is selected as the parabolic freefall model, an uncontrolled gliding model for a fixed wing aircraft, an uncontrolled spin model, an autorotation model, or any other suitable model that models a crash trajectory for a UAV.

In operation 520, the optimizer 135 defines the operational area and NCZs 105 and sends the defined operational area and NCZs 105 to the trajectory risk calculator 115. The optimizer 135 defines the geographic area for a particular flight as illustrated in FIGS. 2A and 3A and, based on the 3D buildings/infrastructure model for the geographic area, determines the NCZs for the geographic area.

Although described herein as occurring in sequence, it should be understood that operations 505-520 can be performed in any order or as a single operation. For example, the optimizer 135 can send one or more of the defined operational environment, flight trajectory 110 and flight conditions, selected crashing trajectory model, and the defined operational area and NCZs 105 to the trajectory risk calculator 115 in a single transmission rather than sending four separate transmissions.

In operation 525, the trajectory risk calculator 115 calculates the trajectory risk of the defined flight trajectory 110 based on the defined operational environment, flight conditions, selected crashing trajectory model, and the defined operational area and NCZs 105. The process of calculating the trajectory risk for the defined flight trajectory 110 is described in greater detail below with regards to FIG. 6. For example, the trajectory risk calculator 115 calculates a risk score for each location point of the plurality of location points, which collectively are used to calculate a total risk score, for example, a flight risk value, for the flight trajectory 110.

In operation 530, the optimizer 135 generates a risk profile and a total risk score. The risk profile includes an analysis of the 4D location points most likely to result in a crash into a NCZ in the event of a critical failure. For example, each 4D location point that receives a risk value above a particular threshold is flagged in the risk profile. In some implementations, the total risk score, S, is identified as the number of times through the entire flight trajectory 110 that the NCZ would be violated should a critical failure occur at each infinitesimal point of the flight trajectory 110.

In operation 535, the optimizer 135 compares the calculated flight risk value for the flight trajectory 110 to a risk threshold for the operation including the flight trajectory 110. In other implementations, the comparison is performed by the operator of the UAV 145, such as the PIC. In implementations where the flight risk value is below the risk threshold, the optimizer 135 classifies the flight trajectory 110 as safe and acceptable for execution. In implementations where the flight risk value is above the risk threshold, the optimizer 135 classifies at least some portion of the flight trajectory 110 as unsafe and therefore the flight trajectory 110 is unacceptable for execution.

The risk threshold is a property of an operation comprised of the flight trajectory 110, the NCZ, and circumstances of the operation. The circumstances include the time of day, type of aircraft, population density of the area in which the operation is be performed, the particular type of infrastructure within the NCZ, and so forth. Accordingly, a particular flight trajectory 110 can lead to a different risk threshold under different circumstances.

In some implementations, the risk threshold is determined by the operator of the UAV 145, such as the PIC, based on an evaluation of the particular mission, the calculated risk value for the flight trajectory 110, and risk profiles. The risk threshold value depends on the operation and its circumstances. For example, other circumstances include whether a potential crash into the NCZ implies a risk to human lives or just to infrastructure, a likelihood of recovering the UAV 145 from a crash in the NCZ, the population density within the NCZ, whether the flight risk value changes by performing the flight at night instead of in daytime, and so forth.

In some implementations, the risk threshold is dynamic. In other words, the risk threshold is dependent upon the type of operation of the flight. For example, a flight trajectory 110 for an operation in a high risk area may have a high risk threshold, such that the flight trajectory 110 must meet stringent safety requirements. An another example, a flight trajectory 110 for an operation in a low risk area may have a lower risk threshold, such that the flight trajectory 110 can meet lower safety requirements.

In implementations where the flight trajectory 110 is classified as safe, in operation 540 the optimizer 135 loads the flight trajectory 110 to the UAV 145. Once the flight trajectory 110 is loaded to the UAV 145, the UAV 145 can execute a flight that includes the flight trajectory 110. In implementations where the flight trajectory 110 is classified as unsafe, the optimizer 135 returns to the beginning of method 500 and updates one or more of the operational environment, the flight trajectory 110, the flight conditions, the crashing trajectory model, and the operational area to be updated in order for the safety of the flight trajectory 110 to be improved.

Figure 6:
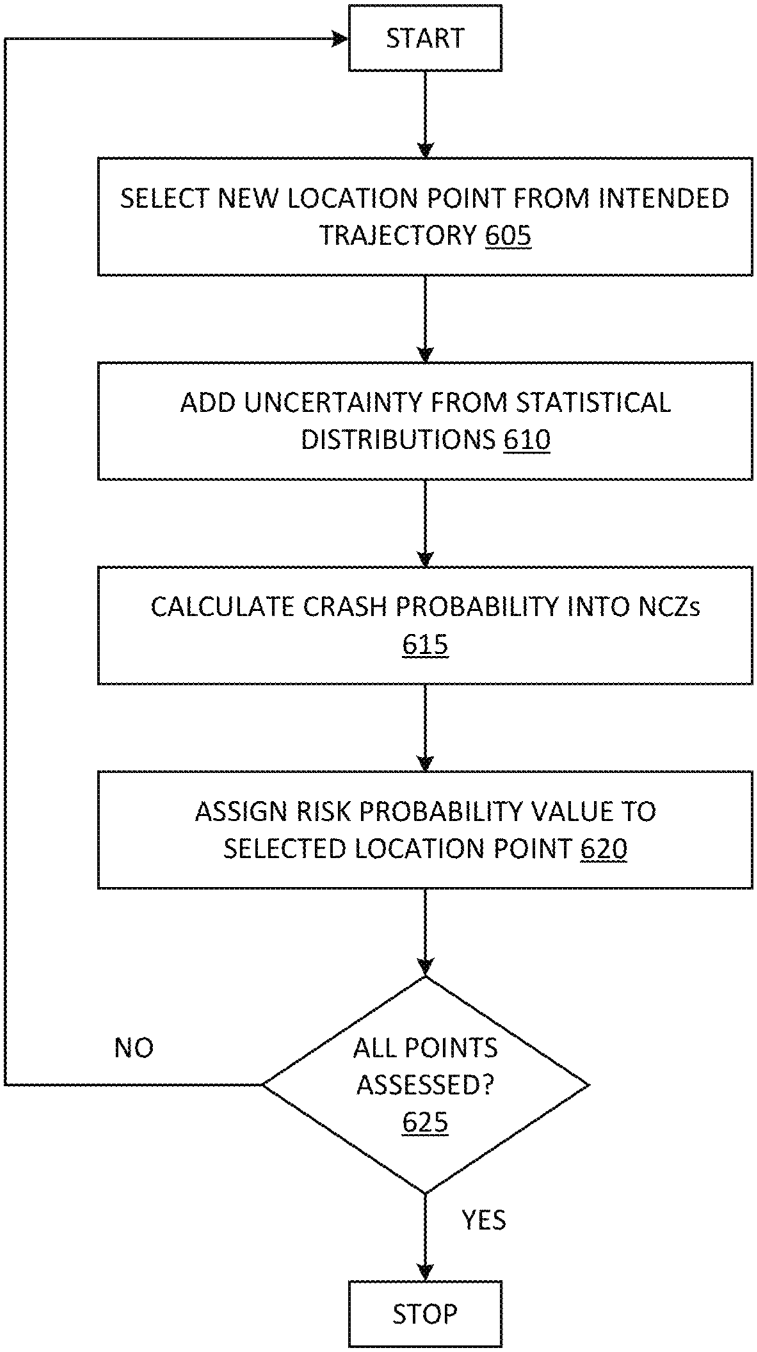
FIG. 6 illustrates a computer-implemented method of calculating a trajectory risk according to various implementations of the present disclosure.

FIG. 6 illustrates a computer-implemented method of calculating a trajectory risk according to various implementations of the present disclosure. The method 600 can be executed by one or more components described herein, such as the electronic device 1000.

The method 600 begins by the trajectory risk calculator 115 selecting a new location point from the intended flight trajectory 110 in operation 605. As described herein, the flight trajectory 110 includes a series of 4D location points. In some implementations, the trajectory risk calculator 115 begins by selecting an initial 4D location point, such as a take-off location, of the series of 4D location points.

In some implementations, the trajectory risk calculator 115 identifies the selected location point in an environmental model. The environmental model can include one or more of a topographic map, an elevation map, infrastructure models, a weather model, or any other suitable model that identifies the selected location point within a geographical area and captures environmental conditions of the selected location point.

In operation 610, the trajectory risk calculator 115 adds uncertainty from the statistical distributions. The uncertainty is modeled by various statistical distributions in order to account for deviations in the flight trajectory 110. For example, the statistical distributions can include one or more of deviations in the planned 3D position, such as the latitude, longitude, and altitude, deviations in the planned velocity magnitude, deviations in the ascent angle at the selected location point, or deviations in the descent angle at the selected location point. Deviations in the trajectory can be caused by a critical failure, environmental conditions such as wind, rain, snow, sleet, and so forth, a collision avoidance maneuver based on the detection of a foreign object, contact with a foreign object, and so forth.

For example, as described above with reference to FIGS. 4A-4C, a calculated risk score that fails to account for uncertainties would be incomplete. Therefore, random variations in the components of the position vectors $\vec{x}=(x+\delta_r(x),y+\delta_r(y),z+\delta_t(z))$ and $\vec{v}=(v_z+\delta_r(v_z),v_y+\delta_r(v_y),v_z+\delta_t(v_z))$ are introduced to provide a more robust risk profile.

In operation 615, the trajectory risk calculator 115 calculates a crash probability into the NCZs based on the added uncertainty. In some implementations, the crash probability into a NCZ is calculated by applying the uncertainty from the statistical distributions to falling mode information. As described herein, the falling mode information can include one or more crash trajectory models for how the UAV is expected to fall in the event of different types of critical failures, such as a total LOP event, failure of one or more specific rotors of the UAV 145, and so forth. The falling mode information model can include one or more of a parabolic free fall crashing model, an uncontrolled gliding model, a model based on uncontrolled spin of the UAV 145, a model based on autorotation of the UAV 145, a parachute drifting model, and so forth. In some implementations, the crash trajectory model, or models, is generated by the trajectory risk calculator 115.

In operation 620, the trajectory risk calculator 115 assigns a risk probability value to the selected 4D location point based on the calculated crash probability. In some implementations, the risk probability value is a numerical score indicating the likelihood of risk for the particular 4D location point. In other implementations, the trajectory risk calculator 115 assigns an alphanumerical value indicating the likelihood of risk for the particular 4D location point, such as an A, B, C, etc. In other implementations, the trajectory risk calculator 115 assigns a binary value of 'SAFE' or 'UNSAFE' indicating the likelihood of risk for the particular 4D location point.

In operation 625, the trajectory risk calculator 115 determines whether all points of the flight trajectory 110 have been assessed. If not all points of the flight trajectory 110 have been assessed, the trajectory risk calculator 115 returns to the beginning of the method 600 and selects the next 4D location point along the flight trajectory 110. Uncertainty is added, a crash probability into NCZs is calculated, and a risk probability value is assigned for each point of the series of 4D location points that together encompass the flight trajectory 110. In other words, a risk probability value is calculated for each individual 4D location point in the flight trajectory 110. When the final 4D location point has been assigned a risk probability value, in operation 625 the trajectory risk calculator determines all points have been accessed.

Once the risk probability value is calculated for each of the 4D location points of the flight trajectory 110, a trajectory risk profile, such as the trajectory risk profile 120 for the entire flight trajectory 110, is calculated, or generated, and compared to the intended flight trajectory 110 as described herein.

Figure 7A:
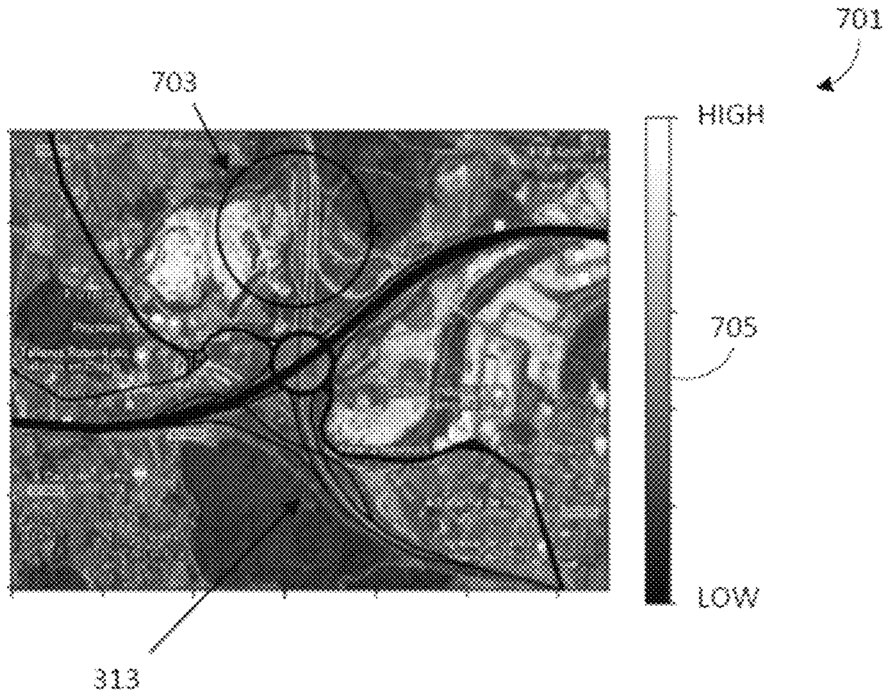
FIG. 7A illustrates a zenithal view of a last loop of an optimized spiral trajectory and NCZ violation risk for the last loop according to various implementations of the present disclosure.
Figure 7B:
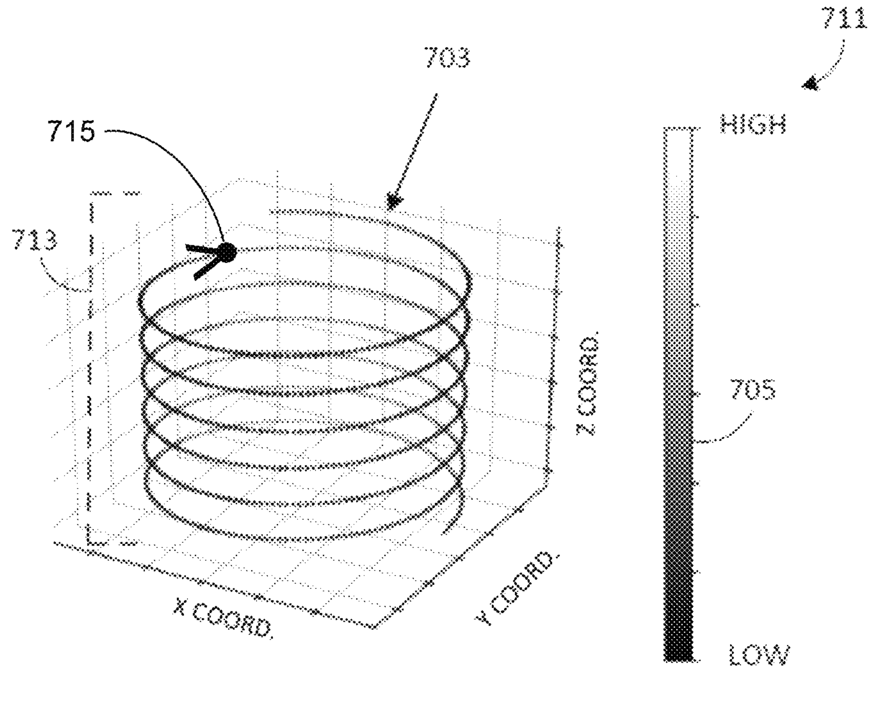
FIG. 7B illustrates a 3D representation of a NCZ violation risk of the optimized spiral trajectory according to various implementations of the present disclosure.

FIG. 7A illustrates a zenithal view of a last loop of an optimized spiral trajectory and NCZ violation risk for the last loop according to various implementations of the present disclosure. FIG. 7B illustrates a 3D representation of a NCZ violation risk of the optimized spiral trajectory according to various implementations of the present disclosure. The examples presented in FIGS. 7A and 7B are for illustration only and should not be construed as limiting. Various components illustrated in FIGS. 7A and 7B can be added, omitted, and so forth without departing from the scope of the present disclosure.

The zenithal view 701 illustrated in FIG. 7A illustrates a loop 703 of the planned spiral trajectory 713 overlaid on the NCZ 313 identified in FIG. 3B. Each portion of the loop 703 is identified with a risk value, as shown on the risk spectrum 705. For example, each portion of the loop 703 is shaded corresponding to the calculated risk value, calculated by the trajectory risk calculator 115. It should be understood in some instances, high risk values do not necessarily correspond 1:1 with the NCZ 313.

In one implementation, a parabolic free fall crashing model is implemented for a flight about the NCZ 313 having the planned spiral trajectory 713. In the parabolic free fall crashing model, if a critical failure is detected, the UAV 145 descends in a falling trajectory of a parabola that obeys gravitational forces and discards other aerodynamic forces. For example, the parabolic free fall crashing model can be used for multiple rotors of the UAV 145 experiencing a LOP or LOE event. The mission plan for the flight of the UAV 145 can consider an ascending spiral trajectory with a constant velocity magnitude of v=10 m/s having been parameterized with two variables, the latitude and longitude of the center of the trajectory. The mission plan for the flight additionally has an uncertainty in the velocity magnitude is modelled by a standard distribution with $u_v$=10 m/s and $\sigma_v$=5 m/s. The implementation illustrated in FIGS. 7A and 7B further has an objective function to be minimized, which takes into account both the distance to a traffic junction, i.e., the object of interest, and the risk scores as described in the description of FIGS. 4A-4C. Also illustrated in FIG. 7B is an example of a 4D location point 715 on the trajectory 713. The example 4D location point 715 includes a 3D position (e.g., latitude, longitude, and altitude, as indicated by the dot) and a velocity (as indicated by the arrow).

Minimizing the objective function minimizes the total risk score, S, for the flight trajectory 110. As described herein, the total risk score S represents the number of times through the entire flight trajectory 110 that the NCZ 105 would be violated should a critical failure occur at each infinitesimal point of the flight trajectory 110. Accordingly, the total risk score S should be as small as possible for a particular flight trajectory 110. The total risk score S is defined as a path integral of $S=\int_0^{length} P_{LoP}(x)dx$, where dx is an infinitesimal element belonging to the trajectory. A specific score, s, is the number of times a NCZ 105 is violated per linear meter and defined as s=S/total length.

In the examples described herein, the flight trajectory 110 can illustrated as a circular helix. The optimizer 135 optimizes the circular helix by optimizing for x and y center helix position to minimize the total risk score S of the flight trajectory 110 in order to find the least dangerous trajectory with a given radius, velocity, stochasticity, and shape.

In some implementations, the optimizer 135 includes a machine learning (ML) model that receives the parameters of the flight trajectory 110, including the take-off point, landing point, NCZs 105, and so forth, and determines the optimal flight trajectory 110. For example, the system 100 can include a feedback loop where the ML model updates the flight trajectory 110, receives an indication of whether the flight trajectory 110 is safe or unsafe based on the comparison of the trajectory risk profile 120 to the intended flight trajectory 110, and updates the flight trajectory 110 again in the example of the flight trajectory 110 still being below the risk threshold and therefore being unsafe. In this way, the optimizer 135 compares the updated total risk score S to the previous total risk score S to determine the effect of the updates to the flight trajectory 110 in order to continually monitor, update, and improve the flight trajectory 110.

Figure 8:
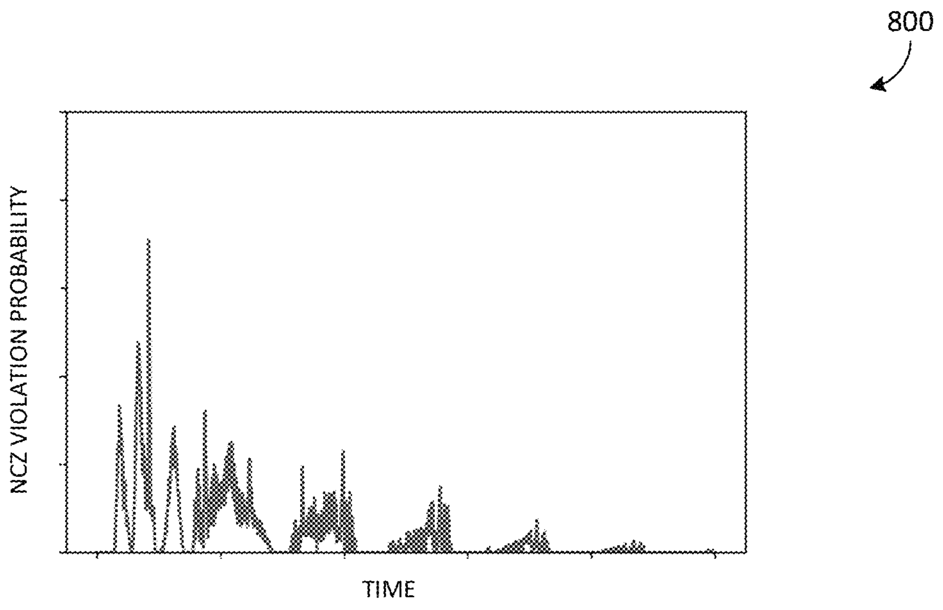
FIG. 8 illustrates a risk profile for a parachute model according to various implementations of the present disclosure.

FIG. 8 illustrates a risk profile for a parachute model according to various implementations of the present disclosure. The risk profile 800 illustrated in FIG. 8 is for illustration only and should not be construed as limiting. Various examples of the risk profile 800 can be used without departing from the scope of the present disclosure.

The risk profile 800 illustrates the probability of hitting a NCZ 105 if a critical failure, such as a LOP, occurs using the parachute model for a particular flight trajectory 110 along the y-axis and time along the x-axis. It should be understood that in this example, the probability of a violation of a NCZ is plotted against the t parameter, which as described herein represents time. As shown in FIG. 8, the probability gradually decreases over time for the particular flight trajectory 110. It should be understood that the risk profile 800 can differ for a different flight trajectory 110 depending on the trajectory, NCZs 105, geographic location, etc. For example, another flight trajectory 110 in another geographic location taking into account different NCZs 105 may have a relatively consistent, over time, probability of hitting a NCZ 105 if a critical failure occurs or an increasing probability of hitting a NCZ 105 if a critical failure occurs.

Figure 9:
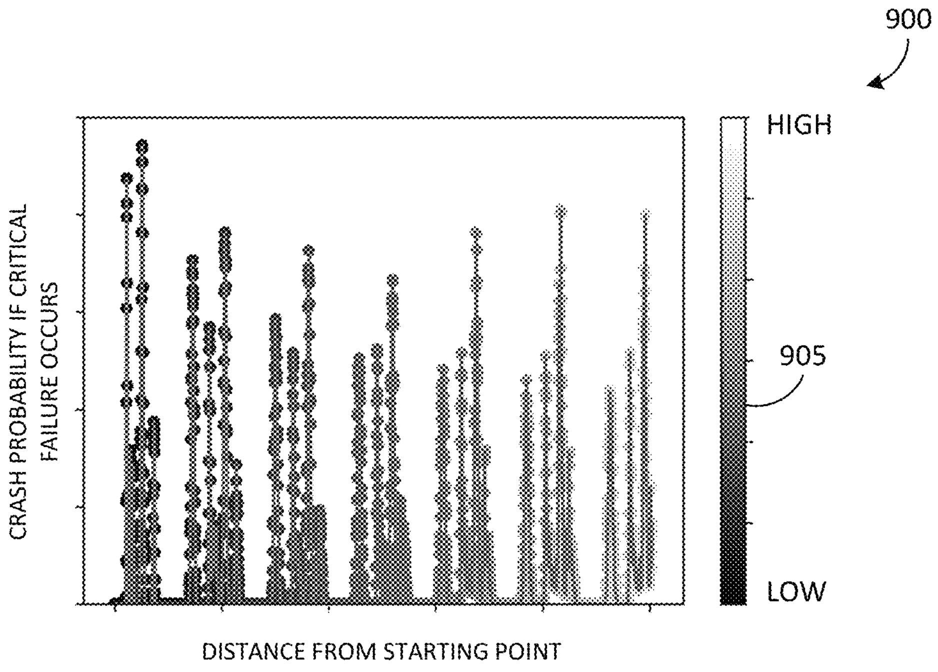
FIG. 9 illustrates a NCZ violation probability and total impact energy model according to various implementations of the present disclosure.

FIG. 9 illustrates a NCZ violation probability and total impact energy model according to various implementations of the present disclosure. The model 900 illustrated in FIG. 9 is for illustration only and should not be construed as limiting. Various examples of the model 900 can be used without departing from the scope of the present disclosure.

The model 900 illustrates the crash probability if a critical failure, such as a LOP event, occurs for a particular flight trajectory 110 along the y-axis and a distance from the starting point along the x-axis. The model 900 is further color coded to identify the total impact energy, such as kinetic energy, upon crashing, should a crash occur, as shown on the crash probability spectrum 905. As shown in FIG. 9, the total impact energy gradually increases as the distance from the starting point increases for the particular flight trajectory 110. It should be understood that the model 900 can differ for a different flight trajectory 110 depending on the trajectory, NCZs 105, geographic location, etc. For example, another flight trajectory 110 in another geographic location taking into account different NCZs 105 may have a relatively consistent, over time, total impact energy if a critical failure occurs or a decreasing total impact energy if a critical failure occurs.

Figure 10:
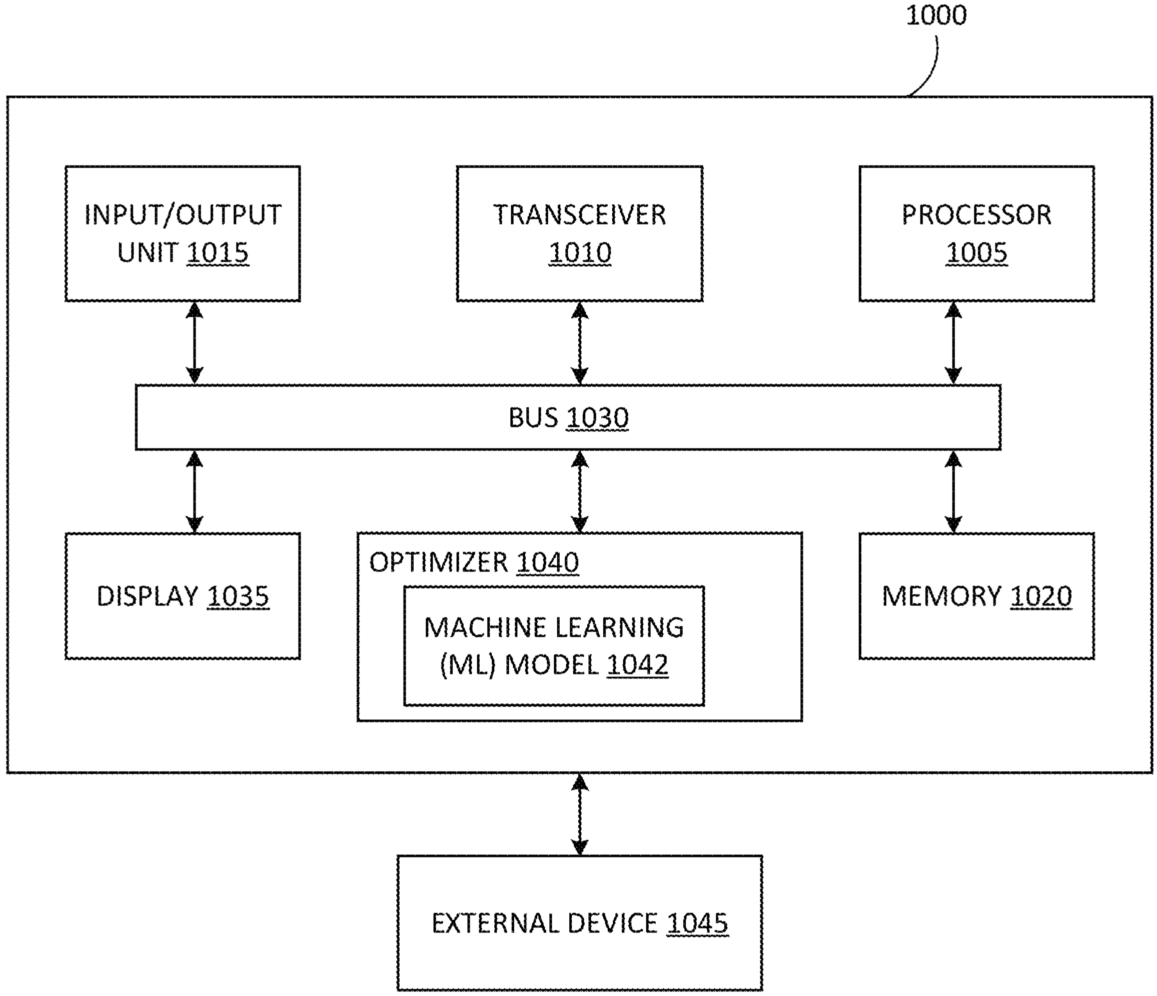
FIG. 10 illustrates an electronic device according to various implementations of the present disclosure.

FIG. 10 illustrates an electronic device according to various implementations of the present disclosure. The example of the electronic device 1000 illustrated in FIG. 10 is for illustration only. Other examples of the electronic device 1000 can be used without departing from the scope of the present disclosure.

In some implementations, the electronic device 1000 is onboard a vehicle, such as the aircraft 1200. In other implementations, the electronic device 1000 is onboard a vehicle such as a manned aircraft, an unmanned aircraft, a drone, a car, a truck, a boat, a motorcycle, or any other vehicle that can detect and avoid objects. In other implementations, the electronic device 1000 is a vehicle, such as the aircraft 1200, and includes additional electrical and mechanical elements such as wings, landing gear, etc. In still other implementations, the electronic device 1000 is an electronic device that is used to control a vehicle, or a flight of vehicles, such as the UAV 145 described herein, to execute an operation. For example, the electronic device 1000 can be a laptop computer, a mobile electronic device, a desktop computer, a kiosk, a wearable electronic device, or any other suitable electronic device to control one or more unmanned vehicles, such as the UAV 145.

The electronic device 1000 includes a processor 1005, a transceiver 1010, an input/output (I/O) unit 1015, a memory, or medium, 1020, and a display 1035. The processor 1005, the transceiver 1010, the I/O unit 1015, and the memory 1020 are connected to one another by a bus 1030 to send messages between each of the components of the electronic device 1000. The memory 1020 further includes a storage to store data and various programs. The programs include an operating system and one or more applications that are executed by the processor 1005.

The processor 1005 is configured to execute the operating system and the one or more applications stored in the memory 1020. The applications include particular program code executed by the processor 1005 that performs one or more of the functions described in greater detail below.

The transceiver 1010 is configured to send and receive signals to and from, respectively, the electronic device 1000. For example, the transceiver 1010 sends and receives signals to an external device, such as a user equipment (UE), a server, or any other suitable electronic device.

The I/O unit 1015 is configured to allow the electronic device 1000 to directly connect to another device. For example, the I/O unit 1015 includes one or more ports configured to allow connections to and from the electronic device 1000.

The display 1035 is configured to display information to an operator of the electronic device 1000. In some implementations, the display 1035 is a touch screen.

The electronic device 1000 optionally includes or is connected to one or more optimizer 1040. The optimizer 1040 can be the optimizer 135 described in greater detail above. In some implementations, the optimizer 1040 includes a ML model 1042 as described in greater detail above.

In some implementations, the electronic device 1000 is connected to an external device 1045. In some implementations, the external device 1045 can be an electronic device similar to the electronic device 1000. For example, the external device 1045 can be an electronic device used by an external operator of the electronic device 1000. In some implementations, the external device 1045 is an unmanned vehicle such as the UAV 145. In some implementations, the external device 1045 represents a fleet of external devices 1045, such as a fleet that includes a plurality of UAVs 145.

Although described herein as separate devices, in some implementations the external device 1045 includes one or more hardware elements as the electronic device 1000. For example, the external device 1045 can include a processor 1005, a transceiver 1010, an input/output (I/O) unit 1015, a memory, or medium, 1020, a display 1035, and an optimizer 1040. One or more operations as described herein can be executed on the external device 1045, i.e., the UAV 145.

In some implementations, the processor 1005 executes one or more components of the system 100 described herein. For example, the processor 1005 executes the trajectory risk calculator 115 to calculate the risk of a particular flight trajectory 110 and executes the ML model 1042 to determine the optimal trajectory for the flight trajectory 110. The NCZs 105, each flight trajectory 110, environmental models, and so forth are stored in the memory 1020. Results of the calculated risks are displayed on the display 1035 and communicated via the transceiver 1010 to an external device 1045.

Although described in connection with the electronic device 1000, examples of the disclosure are capable of implementation with numerous other general-purpose or special-purpose computing system environments, configurations, or devices. Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices accept input from the user in any way, including from input devices such as a keyboard or pointing device, via gesture input, proximity input (such as by hovering), and/or via voice input.

Implementations of the disclosure are described in the general context of computer-executable instructions, such as program modules, executed by one or more computers or other devices in software, firmware, hardware, or a combination thereof. In one example, the computer-executable instructions are organized into one or more computer-executable components or modules. Generally, program modules include, but are not limited to, routines, programs, objects, components, and data structures that perform particular tasks or implement particular abstract data types. In one example, aspects of the disclosure are implemented with any number and organization of such components or modules. For example, aspects of the disclosure are not limited to the specific computer-executable instructions or the specific components or modules illustrated in the figures and described herein. Other examples of the disclosure include different computer-executable instructions or components having more or less functionality than illustrated and described herein. In implementations involving a general-purpose computer, aspects of the disclosure transform the general-purpose computer into a special-purpose computing device when configured to execute the instructions described herein.

Figure 11:
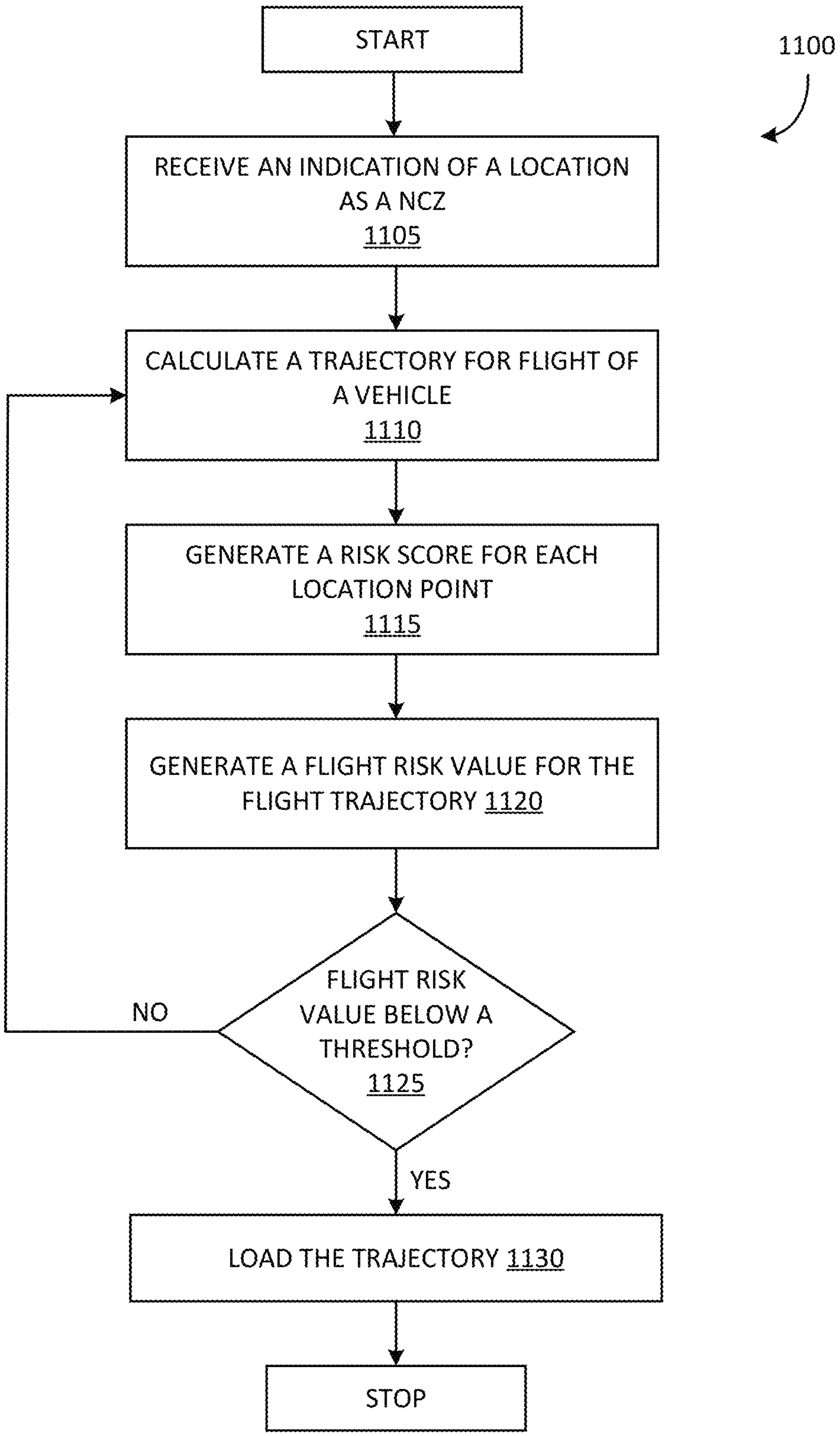
FIG. 11 a computer-implemented method of preventing collisions of a UAV according to various implementations of the present disclosure.

FIG. 11 a computer-implemented method of preventing collisions of a UAV according to various implementations of the present disclosure. The method 1100 can be executed by one or more component described herein, such as the electronic device 1000.

The method 1100 begins by receiving an indication of a location as a NCZ, such as the NCZ 105 in operation 1105. In some implementations, the electronic device 1000 identifies a particular location and tags, or flags, the particular location as a NCZ 105. In other implementations, the electronic device 1000 receives an indication of the location as a NCZ 105, such as from another electronic device or via an input received from an operator.

In operation 1110, the electronic device 1000 calculates a trajectory for flight of a vehicle. For example, the trajectory for flight can be the flight trajectory 110 and the vehicle can be the UAV 145. The trajectory for flight includes a plurality of location points, such as the 4D location points described herein that each include a longitude, a latitude, an altitude, and a velocity for the UAV 145 at the particular location point. A sequence of the plurality of location points collectively create a flight trajectory 110 for a particular flight operation to be executed by the UAV 145.

In operation 1115, the electronic device 1000 generates a risk score for each location point of the plurality of location points. In particular, the electronic device 1000 selects a 3D position of the location point from the flight trajectory 110 and identifies the 3D position in an environmental model that includes one or more of a topographic map, an elevation map, infrastructure models, and a weather model. The electronic device 1000 adds uncertainty from one or more statistical distributions to a model including the identified 3D position. The statistical distributions can include one or more of deviations in the planned 3D position, such as the latitude, longitude, and altitude, deviations in the planned velocity magnitude, deviations in the ascent angle at the selected location point, or deviations in the descent angle at the selected location point. The electronic device 1000 calculates a crash probability into the NCZ 105 in the event of a critical failure at the particular location point by generating a crash trajectory model and calculating the crash probability based on the generated crash trajectory model. In some implementations, the crash trajectory model includes one or more of an uncontrolled gliding model for the vehicle, a parabolic freefall model, an uncontrolled spin model, and an autorotation model. Based on the calculated crash probability, the electronic device 1000 assigns a risk probability to the selected 3D position of the location point. The assigned risk probability is the generated risk score for the particular location point of the flight trajectory 110.

In operation 1120, the electronic device 1000 generates a flight risk value for the trajectory of the flight of the vehicle based on the generated risk scores for each of the location points. In some implementations, the flight risk value for the trajectory of the flight of the vehicle is the total risk score S described herein. In other words, the flight risk value is the number of times through the entire flight trajectory 110 that the NCZ 105 would be violated should a critical failure occur at each infinitesimal point of the flight trajectory 110.

In operation 1125, the electronic device 1000 determines whether the flight risk value is below a risk threshold. The electronic device 1000 identifies a particular operation for the flight of the vehicle that is the flight trajectory 110 and determines the risk threshold based on the identified operation. For example, the risk threshold can be dynamic, such that higher risk is tolerated for some operations than for other operations. In examples where the flight risk value is determined to be above the risk threshold, the electronic device 1000 classifies the flight of the vehicle, based upon the particular flight trajectory 110, as unsafe and returns to operation 1110. In operation 1110, the electronic device 1000 calculates an updated trajectory for the flight of the vehicle and proceeds through the method 1100 until a flight trajectory 110 with a flight risk below the risk threshold is calculated. In examples where the flight risk value is determined to be below the risk threshold, the electronic device 1000 classifies the flight of the vehicle, based upon the particular flight trajectory 110, as safe and loads the flight trajectory 110 to the vehicle in operation 1130.

In some implementations, the electronic device 1000 automatically controls the vehicle to execute the loaded flight trajectory 110 in order to execute the identified operation. In other words, the vehicle automatically traverses the flight trajectory 110 without additional user input being received, such as from an operator. In other implementations, the vehicle is manually controlled by an operator, for example via inputs received by the electronic device 1000, to traverse the flight trajectory 110.

Figure 12:
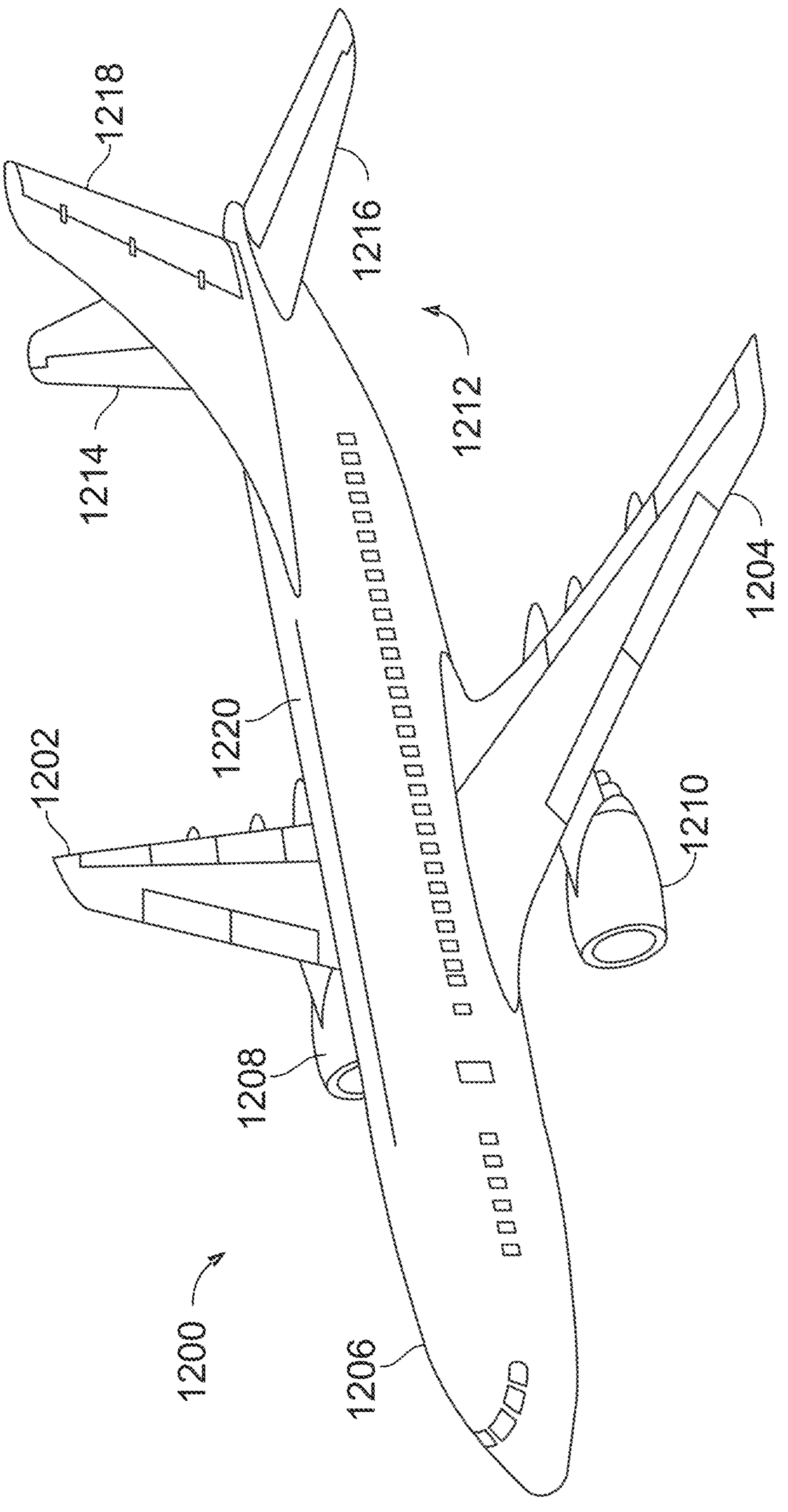
FIG. 12 illustrates a schematic perspective view of an aircraft including one or more processing devices described herein according to various implementations of the present disclosure.

FIG. 12 illustrates a schematic perspective view of an aircraft having one or more portions controlled by a processing device stored and cooled in a mil-aero conduction cooling chassis as described herein. The aircraft 1200 includes a wing 1202 and a wing 1204 attached to a body 1206. The aircraft 1200 also includes an engine 1208 attached to the wing 1202 and an engine 1210 attached to the wing 1204. The body 1206 has a tail section 1212 with a horizontal stabilizer 1214, a horizontal stabilizer 1216, and a vertical stabilizer 1218 attached to the tail section 1212 of the body 1206. The body 1206 in some implementations has a composite skin 1220.

The aircraft 1200 is an example of the UAV 145 including one or more components controlled by the electronic device 1000. For example, various software and software applications executed by the aircraft 1200 can be controlled by the electronic device 1000.

The illustration of the aircraft 1200 is not meant to imply physical or architectural limitations to the manner in which an illustrative configuration may be implemented. For example, although the aircraft 1200 is a commercial aircraft, the aircraft 1200 can be a military aircraft, a rotorcraft, a multirotor aircraft, a helicopter, an unmanned aerial vehicle, or any other suitable aircraft. Other vehicles are possible as well, such as, for example but without limitation, an automobile, a motorcycle, a bus, a boat, a train, or the like.

The following clauses describe further aspects of the present disclosure. In some implementations, the clauses described below can be further combined in any subcombination without departing from the scope of the present disclosure.

Clause Set A:

A1: A computerized method, comprising:

receiving an indication of a location as a no crash zone (NCZ);

calculating a trajectory for flight of a vehicle, the trajectory includes a plurality of location points;

generating a risk score for each location point of the plurality of location points;

generating, based on the generated risk scores for each of the location points, a flight risk value for the trajectory of the flight of the vehicle;

determining the flight risk value is below a risk threshold; and loading the trajectory to the vehicle.

A2: The method of A1, wherein generating the risk score further comprises:

selecting a three-dimensional (3D) position from the trajectory for the flight of the vehicle, adding uncertainty from a statistical distribution, calculating a crash probability into the NCZ, and assigning a risk probability to the selected 3D position.

A3: The method of A2, further comprising:

identifying the selected 3D position in an environmental model, the environmental model including one or more of a topographic map, an elevation map, infrastructure models, and a weather model.

A4: The method of A2, wherein the statistical distribution includes uncertainties in one or more of a planned velocity magnitude, planned ascent angles, the plurality of location points, and planned descent angles.

A5: The method of A2, wherein calculating the crash probability further comprises:

generating a crash trajectory model including one or more of an uncontrolled gliding model for the vehicle, a parabolic freefall model, an uncontrolled spin model, and an autorotation model, and calculating the crash probability based on the generated crash trajectory model.

A6: The method of A1, wherein determining the flight risk value is below the risk threshold includes:

identifying an operation for the flight of the vehicle, and determining the risk threshold based on the identified operation.

A7: The method of A6, further comprising:

determining the flight risk value is below the determined risk threshold, and classifying the flight of the vehicle as safe.

A8: The method of A7, further comprising:

loading the trajectory to the vehicle based on the flight being classified as safe; and controlling the vehicle to execute the flight.

A9: The method of A6, further comprising:

determining the flight risk value is above the determined risk threshold, classifying the flight of the vehicle as unsafe, and calculating an updated trajectory for the flight of the vehicle.

A10: The method of A1, wherein the vehicle is an unmanned aerial vehicle (UAV).

Clause Set B:

B1: A system, comprising:

at least one processor; and a memory storing instructions that, when executed by the at least one processor, cause the at least one processor to:

receive an indication of a location as a no crash zone (NCZ);

calculate a trajectory for flight of an unmanned aerial vehicle (UAV), the trajectory includes a plurality of location points;

generate a risk score for each location point of the plurality of location points;

generate, based on the generated risk scores for each of the location points, a flight risk value for the trajectory of the flight of the UAV;

determine a risk threshold for the trajectory for the flight of the UAV based on an operation of the flight of the UAV;

determine the flight risk value is below the determined risk threshold; and load the trajectory to the UAV.

B2: The system of B1, wherein, to generate the risk score, the memory further stores instructions causing the at least one processor to:

select a three-dimensional (3D) position from the trajectory for the flight of the UAV, add uncertainty from a statistical distribution, calculate a crash probability into the NCZ, and assign a risk probability to the selected 3D position.

B3: The system of B2, wherein the memory further stores instructions causing the at least one processor to:

identify the selected 3D position in an environmental model, the environmental model including one or more of a topographic map, an elevation map, infrastructure models, and a weather model.

The system of B2, wherein the statistical distribution includes uncertainties in one or more of a planned velocity magnitude, planned ascent angles, the plurality of location points, and planned descent angles.

B5: The system of B2, wherein, to calculate the crash probability, the memory further stores instructions causing the at least one processor to:

generate a crash trajectory model including one or more of an uncontrolled gliding model for the vehicle, a parabolic freefall model, an uncontrolled spin model, and an autorotation model, and calculate the crash probability based on the generated crash trajectory model.

B6: The system of B1, wherein the memory further stores instructions causing the at least one processor to:

determine the flight risk value is below the determined risk threshold, and classify the flight of the UAV as safe.

B7:

The system of B6, wherein the memory further stores instructions causing the at least one processor to:

load the trajectory to the UAV based on the flight being classified as safe; and control the UAV to execute the flight.

B8: The system of B1, wherein the memory further stores instructions causing the at least one processor to:

determine the flight risk value is above the determined risk threshold, classify the flight of the UAV as unsafe, and calculate an updated trajectory for the flight of the UAV.

Clause Set C:

C1: A computer program product comprising a computer usable medium having a computer readable program code embodied therein, the computer readable program code adapted to be executed to:

receive an indication of a location as a no crash zone (NCZ);

calculate a trajectory for flight of an unmanned aerial vehicle (UAV), the trajectory includes a plurality of location points;

generate a risk score for each location point of the plurality of location points;

generate, based on the generated risk scores for each of the location points, a flight risk value for the trajectory of the flight of the UAV;

determine a risk threshold for the trajectory for the flight of the UAV based on an operation of the flight of the UAV;

determine the flight risk value is below the determined risk threshold; and load the trajectory to the UAV.

C2: The computer program product of C1, wherein the computer readable program code is further adapted, to:

select a three-dimensional (3D) position from the trajectory for the flight of the UAV;

identify the selected 3D position in an environmental model, the environmental model including one or more of a topographic map, an elevation map, infrastructure models, and a weather model;

add uncertainty from a statistical distribution, the statistical distribution including uncertainties in one or more of a planned velocity magnitude, planned ascent angles, the plurality of location points, and planned descent angles;

generate a crash trajectory model including one or more of an uncontrolled gliding model for the vehicle, a parabolic freefall model, an uncontrolled spin model, and an autorotation model;

calculate a crash probability based on the generated crash trajectory model; and assign a risk probability to the selected 3D position.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one implementation or may relate to several implementations. The implementations are not limited to those that solve any or all of the stated problems or those that have any or all of the stated benefits and advantages. It will further be understood that reference to 'an' item refers to one or more of those items.

The term "comprising" is used in this disclosure to mean including the feature(s) or act(s) followed thereafter, without excluding the presence of one or more additional features or acts.

In some implementations, the operations illustrated in the figures may be implemented as software instructions encoded on a computer readable medium, in hardware programmed or designed to perform the operations, or both. For example, aspects of the disclosure may be implemented as an ASIC, SoC, or other circuitry including a plurality of interconnected, electrically conductive elements.

The order of execution or performance of the operations in implementations of the disclosure illustrated and described herein is not essential, unless otherwise specified. That is, the operations may be performed in any order, unless otherwise specified, and implementations of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. As an illustration, the above-described implementations (and/or aspects thereof) are usable in combination with each other. In addition, many modifications are practicable to adapt a particular situation or material to the teachings of the various implementations of the disclosure without departing from their scope. While the dimensions and types of materials described herein are intended to define the parameters of the various implementations of the disclosure, the implementations are by no means limiting and are exemplary implementations. Many other implementations will be apparent to those of ordinary skill in the art upon reviewing the above description. The scope of the various implementations of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the disclosure, including the best mode, and also to enable any person of ordinary skill in the art to practice the various implementations of the disclosure, including making and using any devices or systems and performing any incorporated methods. The patentable scope of the various implementations of the disclosure is defined by the claims, and includes other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

Although the present disclosure has been described with reference to various implementations, various changes and modifications can be made without departing from the scope of the present disclosure.

What is claimed is:

1. A computerized method, comprising:

receiving an indication of a geographic area identified as a no crash zone (NCZ), wherein the NCZ is defined based on a three-dimensional (3D) building and infrastructure model for the geographic area;

calculating a trajectory for flight of a vehicle, wherein the trajectory for the flight of the vehicle includes a plurality of location points;

generating, prior to the flight of the vehicle, a risk score for each location point of the plurality of location points along the trajectory for flight of the vehicle, wherein each location point is included at regular distance intervals and regular time intervals along the trajectory for the flight of the vehicle, wherein for each location point the risk score is a risk of the vehicle crashing into the NCZ, and wherein generating the risk score comprises:

assigning a risk probability to each location point from the trajectory for the flight of the vehicle based on one or more deviations from planned variability in an execution of a flight trajectory;

generating, prior to the flight of the vehicle, based on the generated risk score for each location point of the plurality of location points, a flight risk value for the trajectory for the flight of the vehicle;

determining, prior to the flight of the vehicle, that the flight risk value for the trajectory for the flight of the vehicle is below a risk threshold for the vehicle crashing into the NCZ by comparing the flight risk value to the risk threshold;

loading the trajectory for the flight of the vehicle to the vehicle based upon, at least in part, determining the flight risk value for the trajectory for the flight of the vehicle is below the risk threshold for the vehicle crashing into the NCZ; and controlling the vehicle to execute the flight according to the loaded trajectory for the flight of the vehicle.

2. The computerized method of claim 1, wherein generating the risk score further comprises:

selecting a 3D position from the trajectory for the flight of the vehicle, adding uncertainty from a statistical distribution to a vector of the trajectory for the flight of the vehicle corresponding to the 3D position, calculating a crash probability into the NCZ based on the added uncertainty, and assigning a risk probability to the selected 3D position.

3. The computerized method of claim 2, further comprising:

identifying the selected 3D position in an environmental model, the environmental model including one or more of a topographic map, an elevation map, infrastructure models, and a weather model.

4. The computerized method of claim 2, wherein the statistical distribution includes uncertainties in one or more of a planned velocity magnitude, planned ascent angles, the plurality of location points, and planned descent angles.

5. The computerized method of claim 2, wherein calculating the crash probability further comprises:

generating a crash trajectory model including one or more of an uncontrolled gliding model for the vehicle, a parabolic freefall model, an uncontrolled spin model, and an autorotation model, and calculating the crash probability based on the generated crash trajectory model.

6. The computerized method of claim 1, wherein determining the flight risk value is below the risk threshold includes:

identifying an operation for the flight of the vehicle, and determining the risk threshold based on the identified operation.

7. The computerized method of claim 6, further comprising:

determining the flight risk value is above the determined risk threshold, classifying the flight of the vehicle as unsafe, and calculating an updated trajectory for the flight of the vehicle.

8. The computerized method of claim 1, wherein the vehicle is an unmanned aerial vehicle (UAV).

9. A system, comprising:

at least one processor; and a memory storing instructions that, when executed by the at least one processor, cause the at least one processor to:

receive an indication of a geographic area identified as a no crash zone (NCZ), wherein the NCZ is defined based on a three-dimensional (3D) building and infrastructure model for the geographic area;

calculate a trajectory for flight of an unmanned aerial vehicle (UAV), wherein the trajectory for the flight of the UAV includes a plurality of location points;

generate, prior to the flight of the UAV, a risk score for each location point of the plurality of location points along the trajectory for flight of the UAV, wherein each location point is included at regular distance intervals and regular time intervals along the trajectory for the flight of the UAV, wherein for each location point the risk score is a risk of the UAV crashing into the NCZ, and wherein the one or more processors to generate the risk score, are to:

assign a risk probability to each location point from the trajectory for the flight of the UAV based on one or more deviations from planned variability in an execution of a flight trajectory;

generate, prior to the flight of the UAV, based on the generated risk score for each location point of the plurality of location points, a flight risk value for the trajectory for the flight of the UAV;

determine, prior to the flight of the UAV, a risk threshold for the trajectory for the flight of the UAV crashing into the NCZ based on an operation of the flight of the UAV;

determine the flight risk value is below the risk threshold by comparing the flight risk value to the risk threshold;

load the trajectory for the flight of the UAV to the UAV based upon, at least in part, determining the flight risk value for the trajectory for the flight of the UAV is below the risk threshold for the UAV crashing into the NCZ; and control the UAV to execute the flight according to the loaded trajectory.

10. The system of claim 9, wherein, to generate the risk score, the memory further stores instructions causing the at least one processor to:

select a 3D position from the trajectory for the flight of the UAV, add uncertainty from a statistical distribution to a vector of the trajectory for the flight of the UAV corresponding to the 3D position, calculate a crash probability into the NCZ based on the added uncertainty, and assign a risk probability to the selected 3D position.

11. The system of claim 10, wherein the memory further stores instructions causing the at least one processor to:

identify the selected 3D position in an environmental model, the environmental model including one or more of a topographic map, an elevation map, infrastructure models, and a weather model.

12. The system of claim 10, wherein the statistical distribution includes uncertainties in one or more of a planned velocity magnitude, planned ascent angles, the plurality of location points, and planned descent angles.

13. The system of claim 10, wherein, to calculate the crash probability, the memory further stores instructions causing the at least one processor to:

generate a crash trajectory model including one or more of an uncontrolled gliding model for the UAV, a parabolic freefall model, an uncontrolled spin model, and an autorotation model, and calculate the crash probability based on the generated crash trajectory model.

14. The system of claim 9, wherein the memory further stores instructions causing the at least one processor to:

determine the flight risk value is above the determined risk threshold, classify the flight of the UAV as unsafe, and calculate an updated trajectory for the flight of the UAV.

15. A computer program product comprising a non-transitory computer usable medium having a computer readable program code embodied therein, the computer readable program code adapted to be executed to:

receive an indication of a geographic area identified as a no crash zone (NCZ), wherein the NCZ is defined based on a three-dimensional (3D) building and infrastructure model for the geographic area;

calculate a trajectory for flight of an unmanned aerial vehicle (UAV), wherein the trajectory for the flight of the UAV includes a plurality of location points;

generate, prior to the flight of the UAV, a risk score for each location point of the plurality of location points of the trajectory for flight of the UAV, wherein each location point is included at regular distance intervals and regular time intervals along the trajectory for flight of the UAV, wherein for each location point the risk score is a risk of the UAV crashing into the NCZ, and wherein the computer readable program code, when generating the risk score, are to:

assign a risk probability to each location point from the trajectory for the flight of the UAV based on one or more deviations from planned variability in an execution of a flight trajectory;

generate, prior to the flight of the UAV, based on the generated risk score for each location point of the plurality of location points, a flight risk value for the trajectory for the flight of the UAV;

determine, prior to the flight of the UAV, a risk threshold for the trajectory for the flight of the UAV crashing into the NCZ based on an operation of the flight of the UAV;

determine the flight risk value is below the risk threshold by comparing the flight risk value to the risk threshold;

load the trajectory for the flight of the UAV to the UAV based upon, at least in part, determining the flight risk value for the trajectory for the flight of the UAV is below the risk threshold for the UAV crashing into the NCZ; and control the UAV to execute the flight according to the loaded trajectory.

16. The computer program product of claim 15, wherein the computer readable program code is further adapted, to:

select a three-dimensional (3D) position from the trajectory for the flight of the UAV;

identify the selected 3D position in an environmental model, the environmental model including one or more of a topographic map, an elevation map, infrastructure models, and a weather model;

add uncertainty from a statistical distribution to a vector of the trajectory for the flight of the UAV corresponding to the 3D position, the statistical distribution including uncertainties in one or more of a planned velocity magnitude, planned ascent angles, and the plurality of location points, planned descent angles;

generate a crash trajectory model including one or more of an uncontrolled gliding model for the UAV, a parabolic freefall model, an uncontrolled spin model, and an autorotation model;

calculate a crash probability into the NCZ based on the generated crash trajectory model and on the added uncertainty; and assign a risk probability to the selected 3D position.

17. The computerized method of claim 1, further comprising updating the trajectory for the flight of the vehicle to reduce the flight risk value below the risk threshold, wherein updating the trajectory for the flight of the vehicle includes modifying one or more of the plurality of location points of the trajectory for the flight of the vehicle, and wherein the risk score for each location point is based on a risk of the vehicle crashing into the NCZ in an event of a critical failure of the vehicle at that location point.

18. The computerized method of claim 1, wherein calculating a trajectory for flight of a vehicle includes calculating a first flight route as a first proposed trajectory for the flight of the vehicle, and wherein the method further comprises:

calculating a second flight route as a second proposed trajectory for the flight of the vehicle, and selecting one of the first flight route or the second flight route as the trajectory for the flight of the vehicle based on a relative safety rating for the first flight route and the second flight route.

19. The system of claim 9, wherein the memory further stores instructions causing the at least one processor to update the trajectory for the flight of the UAV to reduce the flight risk value below the risk threshold, wherein to update the trajectory for the flight of the UAV includes to modify one or more of the plurality of location points, and wherein the risk score for each location point is based on a risk of the UAV crashing into the NCZ in an event of a critical failure of the UAV at that location point.

20. The system of claim 9, wherein to calculate a trajectory for flight of a vehicle the memory further stores instructions causing the at least one processor to calculate a first flight route as a first proposed trajectory for the flight of the vehicle, and wherein the memory further stores instructions causing the at least one processor to:

calculate a second flight route as a second proposed trajectory for the flight of the vehicle, and select one of the first flight route or the second flight route as the trajectory for the flight of the vehicle based on a relative safety rating for the first flight route and the second flight route.

* * * * *